US012483895B2

(12) United States Patent
Movva et al.

(10) Patent No.: US 12,483,895 B2
(45) Date of Patent: *Nov. 25, 2025

(54) SECURE PAIRING AND PAIRING LOCK FOR ACCESSORY DEVICES

(71) Applicant: Apple Inc., Cupertino, CA (US)

(72) Inventors: Siva Ganesh Movva, Cupertino, CA (US); Raghunandan K. Pai, Saratoga, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 18/055,325

(22) Filed: Nov. 14, 2022

(65) Prior Publication Data
US 2023/0075275 A1 Mar. 9, 2023

Related U.S. Application Data

(63) Continuation of application No. 17/219,595, filed on Mar. 31, 2021, now Pat. No. 11,553,350.

(60) Provisional application No. 63/041,786, filed on Jun. 19, 2020.

(51) Int. Cl.
H04W 12/50 (2021.01)
H04W 12/069 (2021.01)
H04W 76/18 (2018.01)

(52) U.S. Cl.
CPC ......... *H04W 12/50* (2021.01); *H04W 12/069* (2021.01); *H04W 76/18* (2018.02)

(58) Field of Classification Search
None
See application file for complete search history.

(56) References Cited

U.S. PATENT DOCUMENTS

| | | | |
|---|---|---|---|
| 10,951,419 B2 | 3/2021 | Schaap et al. | |
| 11,128,478 B2 | 9/2021 | Galdo et al. | |
| 11,540,137 B2 | 12/2022 | Ledvina et al. | |
| 2003/0186715 A1 | 10/2003 | McGowan | |
| 2010/0153709 A1 | 6/2010 | Thomas et al. | |
| 2014/0143137 A1* | 5/2014 | Carlson | G06Q 20/18 705/39 |
| 2016/0198210 A1* | 7/2016 | Torikai | H04N 21/43615 348/207.1 |
| 2019/0028445 A1 | 1/2019 | McLaughlin et al. | |
| 2020/0288317 A1* | 9/2020 | Diwane | H04W 12/0431 |

* cited by examiner

Primary Examiner — Nelson S. Giddins

(57) ABSTRACT

Embodiments described herein provide a service to enable a user to track a variety of even when those devices are not connected to the internet by either Wi-Fi or cellular. One embodiment provides techniques to enable a pairing registration for a wireless accessory device that enables a server-mediated pairing process to be performed between the wireless accessory device and a companion device.

18 Claims, 26 Drawing Sheets

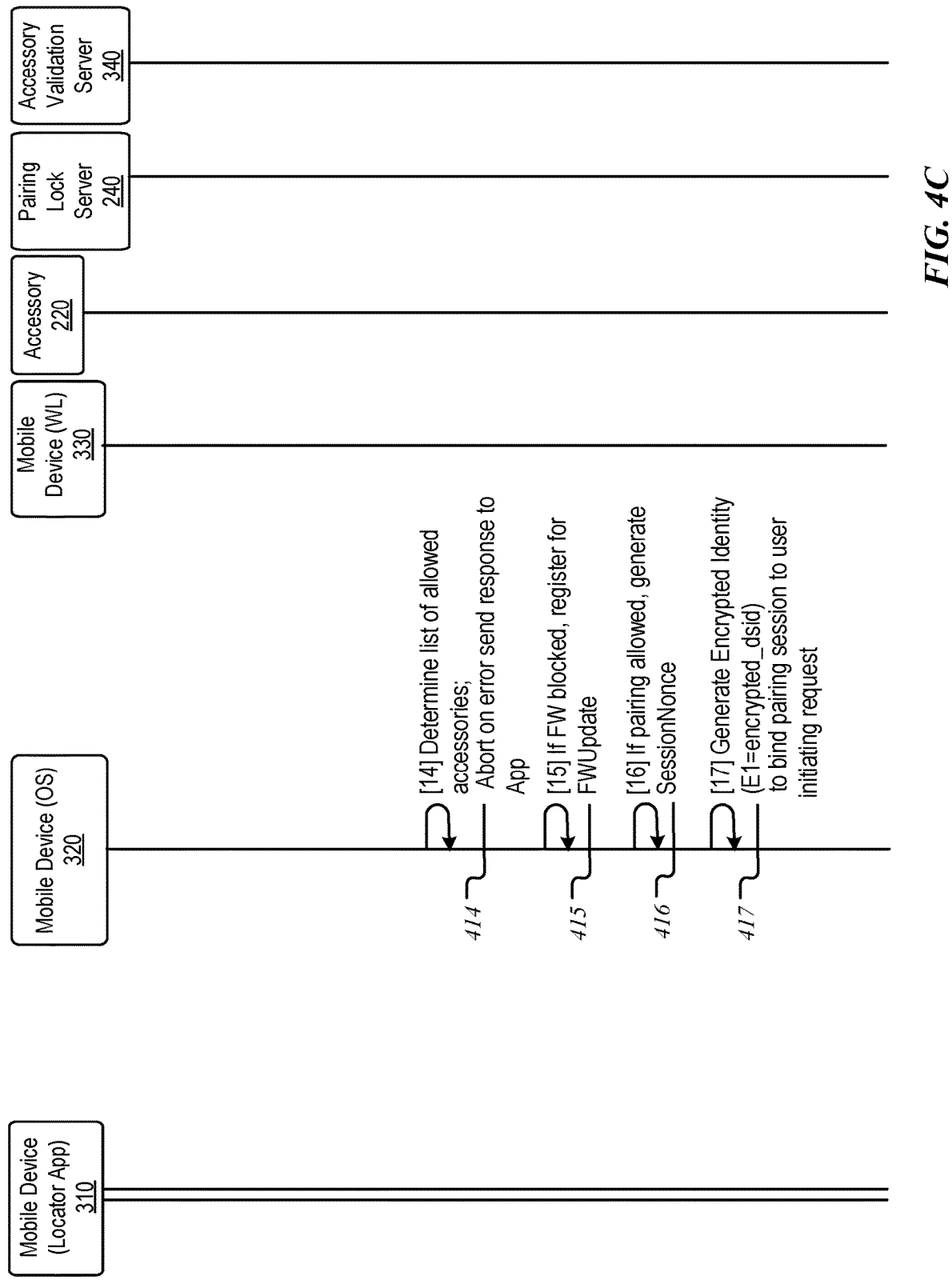

SECURE PAIRING AND PAIRING LOCK FOR ACCESSORY DEVICES

CROSS-REFERENCE

This application is a continuation of co-pending U.S. patent application Ser. No. 17/219,595, filed Mar. 31, 2021, which claims the benefit of priority of U.S. Provisional Application No. 63/041,786 filed Jun. 19, 2020, both which are incorporated herein by reference.

FIELD

Embodiments described herein relate to a system and method of enabling secure pairing and pairing lock for accessory devices.

BACKGROUND OF THE DESCRIPTION

The pairing process enables devices equipped with wireless radios to exchange information that is used to establish an encrypted connection between devices. Security vulnerabilities that may arise during pairing include passive eavesdropping, in which a third device observes the data being exchanged between two paired devices, or a man in the middle attack, in which a third device impersonates legitimate devices in order to cause the legitimate devices to connect to the third device.

SUMMARY OF THE DESCRIPTION

Embodiments described herein enable secure pairing and pairing lock for accessory devices. Pairing security is enhanced by the use of server-mediated pairing that validates the authenticity of devices that participate in the pairing process. Additionally, once devices are paired, a record of the pairing relationship is maintained on a server. The pairing lock process pairs the accessory with a cloud services account associated with an electronic device. An accessory that is paired with an account cannot be paired with an electronic device having a different cloud services account unless a server-mediated unpairing process is performed.

One embodiment provides a server device comprising a network interface coupled with a bus, a memory coupled to the bus, the memory to store instructions for execution, and one or more processors coupled with the bus. The one or more processors are configured to execute the instructions stored in the memory. The instructions cause the one or more processors to perform a server-mediated pairing process, where the one or more processors are to receive a message from a first electronic device, the message including a first software token associated with a second electronic device, determine validity of the first software token, create a pairing lock session and store pairing lock session data in memory upon validation of the software token, generate a second software token for the second electronic device, send, to the first electronic device, a success indication for a server portion of the server-mediated pairing process, the success indication including the second software token, and receive, from the first electronic device, an acknowledgement of completion of the server-mediated pairing process, the acknowledgment including the second software token.

One embodiment provides a method comprising, on a first electronic device having a wireless data interface, receiving a request via an interface of the first electronic device to initiate a server-mediated pairing process with a second electronic device, detecting an advertisement broadcast by the second electronic device, the advertisement including an indication that the second electronic device is ready to begin the server-mediated pairing process, generating a pairing request including pairing data having a first portion associated with the first electronic device and a second portion associated with the second electronic device, sending the pairing request to a server device for validation, receiving a response from the server device indicating a status for the pairing request, the status determined based on the validation performed by the server, and finalizing or aborting the server-mediated pairing process based on the response from the server.

One embodiment provides a non-transitory machine readable medium having instructions stored thereon, the instructions to cause one or more processors of an accessory device to perform operations comprising advertising a ready to pair status via a beacon advertisement packet broadcast via a wireless interface of the accessory device, generating first pairing data and transmitting the first pairing data to a mobile device in response to a request to initiate a pairing process received from the mobile device, wherein the first pairing data includes a software token to validate the accessory device to a server device and the mobile device is to transmit the first pairing data to the server device for validation, receiving a request to finalize the pairing process from the mobile device, wherein the request to finalize the pairing process includes second pairing data generated by the server device, validating the second pairing data, wherein validating the second pairing data includes validating a signature of the pairing data, the signature generated by the server device, and transmitting a pairing status to the mobile device to indicate a success or failure of the pairing process, wherein the pairing status is determined in part on validity of the pairing data.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which:

FIG. 4A-4M are sequence diagrams of a detailed view of the pairing lock process;

DETAILED DESCRIPTION

Figure 1:
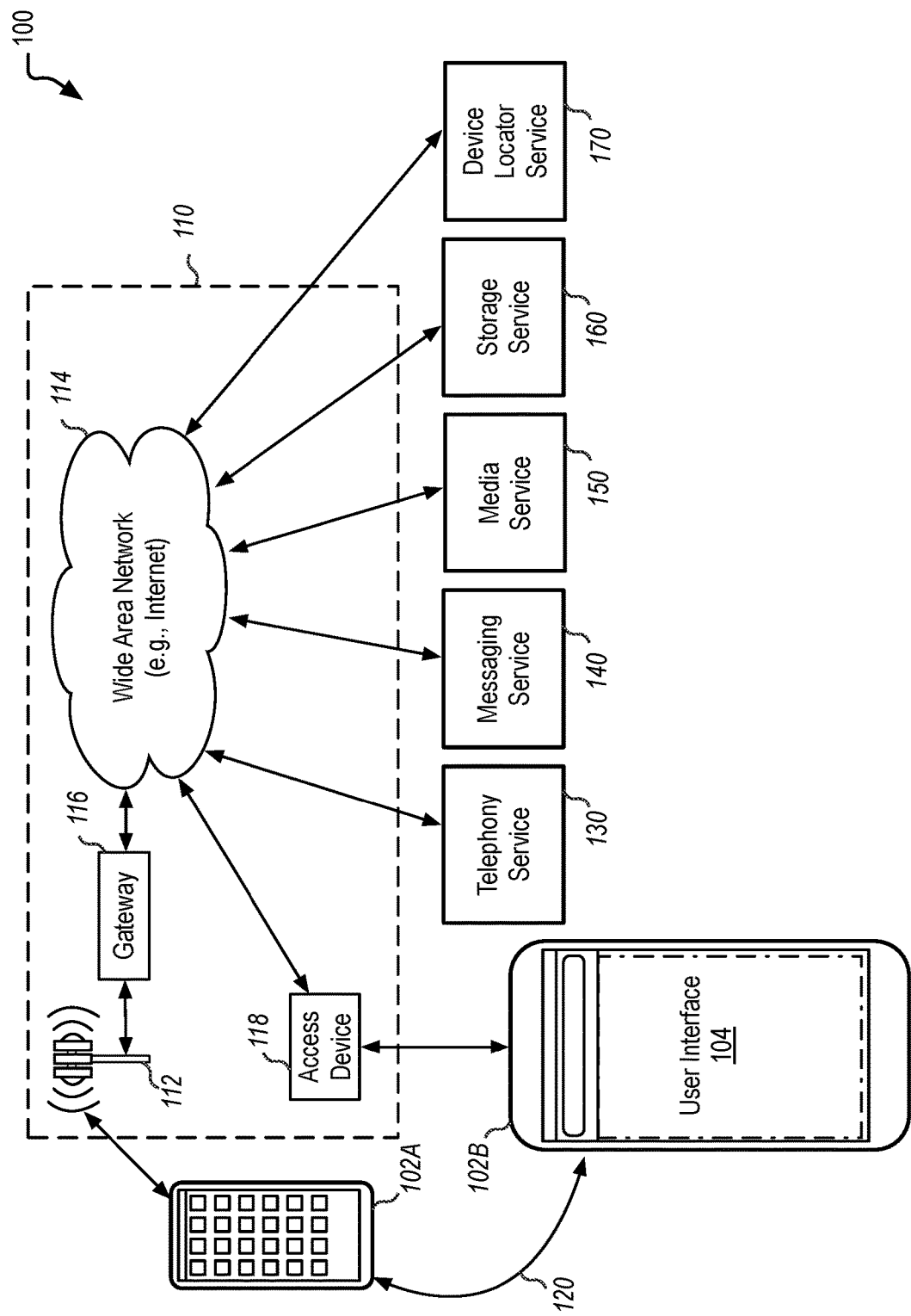
FIG. 1 is a block diagram of a network operating environment for mobile devices, according to an embodiment.

Embodiments described herein provide techniques to enable an accessory device to be paired with a crowdsourced locator service for lost or misplaced devices that cannot communicate with a wide area network. A server-mediated pairing process can be performed to register an accessory device having hardware and software support for the wireless networking protocols used by the crowdsource locator service. The pairing process can validates the legitimacy of the accessory and confirm that the accessory is on a list of accessories that are allowed to be used with the crowdsourced locator service. The accessory can be a first-party or third-party accessory device. Validity for third-party accessory devices can be determined via the use of an accessory validation server that stores a registry of authorized third-party accessories.

The server-mediated pairing process can be performed in addition to the pairing process that is performed for the wireless protocol that enables communication between the accessory device and an electronic device having an account to which the accessory device is paired. For example, pairing operations performed for, for example, a Bluetooth® connection that is used to enable communication between the accessory device and the mobile device may be distinct and separate from the pairing operations described herein.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2021 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POPS protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. For example, mobile device 102A can perform a location query for mobile device 102B. The device locator service 170 can also enable location queries for devices that do not have a network connection via the use of a network of finder devices. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

Mobile devices 102A-102B described herein can couple with each other and with wireless accessories to enable short range radio communication. Devices and accessories from a variety of different vendors can perform a server-mediated pairing process that results in the establishment of a pairing lock. The pairing lock is enabled using a secure token that can be validated by a registration server that maintains a record of the pairing lock. Identification data stored on a wireless accessory that is to be paired with an electronic device can be used to verify the legitimacy of the wireless accessory. The wireless accessory can validate the validity of messages received by the registration server using a signing public key that is associated with the registration server. The public encryption and signing keys of the server, as well as an initial secure software token, can be written to the wireless accessory during manufacture. The initial secure software token is provided by the vendor of the electronic device, the registration server, and the device locator service. The secure software token may be a one-time secure token that, once used, cannot be re-used to pair the accessory. When a secure pairing is successfully completed, a consumed secure software token is replaced with a new token that is provided by the server.

During the pairing process with the electronic device, a payload including the secure token can be encrypted using the public key of the server and transmitted to the server to for validation, along with identifying information for the accessory. If the correct keys and secure token are used and the accessory is determined to be a valid and legitimate accessory, the registration server will indicate that the pairing request is valid and allow the pairing to continue. Otherwise, the server will return that the pairing request is invalid. Upon receipt of a message from the server that the pairing request is valid, successful the pairing process is finalized between the electronic device and the wireless accessory. An encrypted message acknowledging the completion of pairing is generated by the wireless accessory and transmitted to the registration server by the electronic device.

Specific device operations for an exemplary pairing process can be structured as follows: 1) The operating system (OS) of the electronic device generates a pairing identity that's sent to the wireless accessory as encrypted blob (E1). 2) The wireless accessory generates, using the registration server public key, a pairing data encrypted blob (E2) including a) the secure software token, b) the E1 blob, and c) a pairing session key (K1). 3) The registration server validates the E2 and E1 blobs and the software token. Validation can include requesting an accessory validation server to validate that the software token is legitimate and has been successfully used only once. 4) If pairing identity and software token are valid, the registration server sends an encrypted blob (E3) that includes a renewed software token. E3 is encrypted using the pairing session key (K1) generated by Accessory, which prevents extraction of the renewed software token by the electronic device. 5) The accessory then generates a pairing ack data encrypted blob (E4) including the latest software token, pairing status (success/error). E4 is encrypted using Pairing Lock Server's public key. 6) If the final pairing fails, the registration server removes the pairing lock between the accessory and the electronic device. The pairing steps above are intertwined with a collaborative generation of cryptographic keying material by the accessory and the electronic device. The pairing processes is voluntarily entangled with the collaborative key generation process so that if the registration server denies the pairing, the accessory and the electronic device will both independently fail the pairing operation.

Operations are described below are listed as sequential operations. However, explicit adherence to the listed sequence of operations is not required in all embodiments. For example, some of the operations described may be performed in a different order, bypassed, or performed in parallel with other processes described below.

Figure 2:
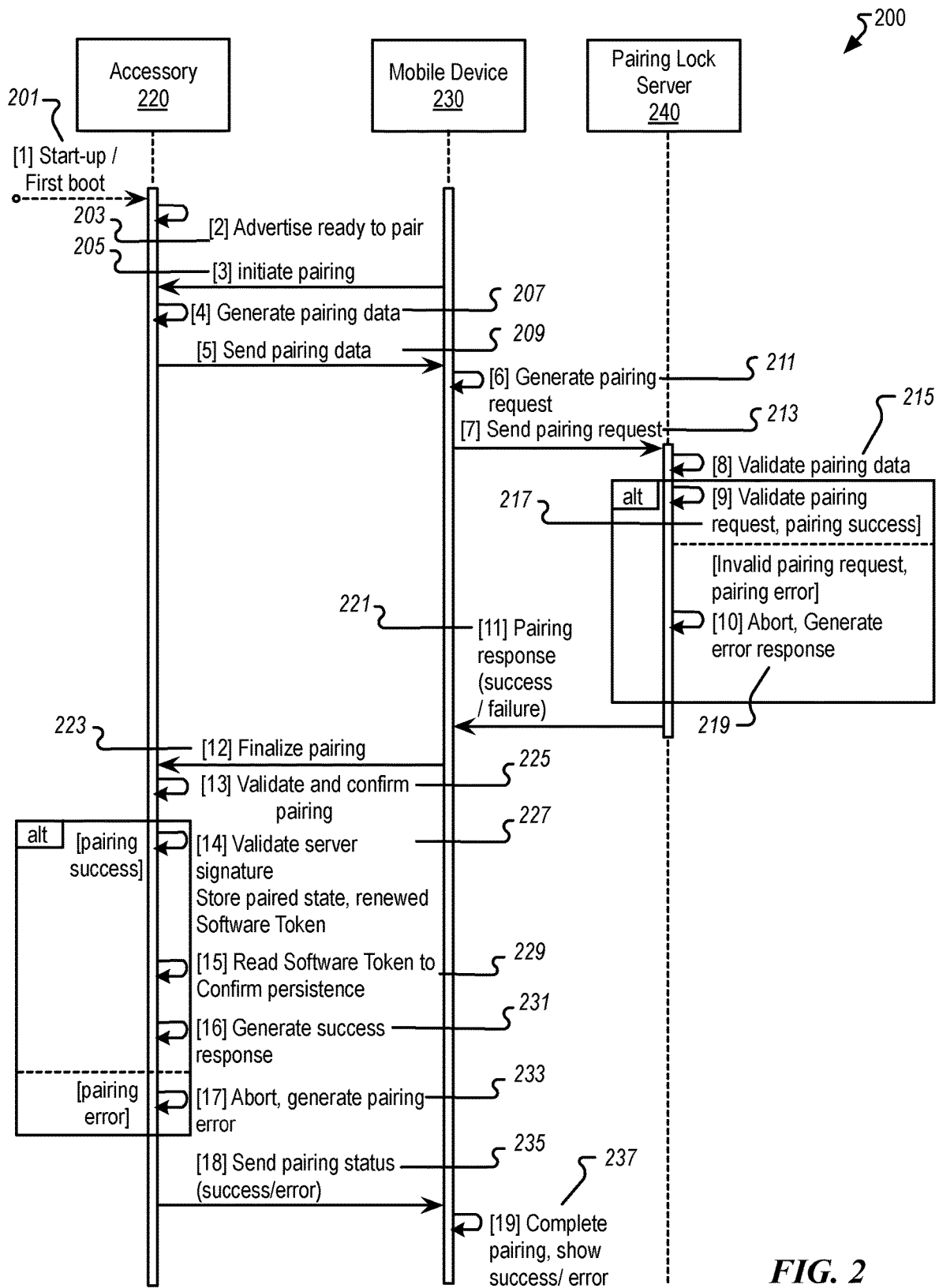
FIG. 2 is a sequence diagram of a pairing lock process.

FIG. 2 is a sequence diagram of a pairing lock process 200. The pairing lock process can be performed between an accessory 220, a mobile device 230, and a pairing lock server 240. The pairing lock server 240 is the registration server that maintains the pairing lock records. The accessory 220, mobile device 230, and pairing lock server 240 can each be provided or maintained by the same or different vendors. The accessory 220 can be any accessory that is configurable to pair with a mobile device 230 via a wireless radio protocol. The accessory 220 can be a wireless accessory that is manufactured by the same vendor as the mobile device 230, or a third-party accessory that is registered with the vendor of the mobile device 230. Wireless radio protocol pairing to enable an encrypted communication channel between the accessory 220 and the mobile device 230 can be performed before the data exchange for the server-mediated pairing process is performed. The wireless radio protocol can be Bluetooth Low Energy (BLE), Zigbee, Z-wave, or another short range wireless radio technology. In one embodiment, other wireless radio technologies can be used.

In one embodiment, accessory 220, during startup/first boot with factory default settings (201), accessory 220 can advertise a "ready to pair" status (203). Mobile device 230 can initiate pairing (205), causing accessory 220 to generate pairing data (207) and send the pairing data (209). Mobile device 230 can then generate (211) a pairing request to send to pairing lock server 240, then send (213) the pairing request to pairing lock server 240. Pairing lock server 240 can then validate (215) the pairing data.

Pairing lock server 240 can either determine that the pairing request is valid (217) or invalid (219), then return (221), to mobile device 230, a pairing response that indicates success or failure. Mobile device 230 can then finalize (223) the pairing with accessory 220. Accessory 220 can validate (225) and confirm the pairing. Upon an indication of a pairing success, accessory 220 can validate (227) the server signature, store the paired state, and store a renewed software token. Accessory 220 can then read (229) the software token to confirm persistence, then generate (231) a success response. If the validation (225) of the pairing fails, accessory 220 can abort (233) the pairing process and generate an error. Accessory 220 can then send (235) a pairing status to indicate a pairing success or error. Mobile device 230 can then complete (237) the pairing and show a success or error.

Figure 3:
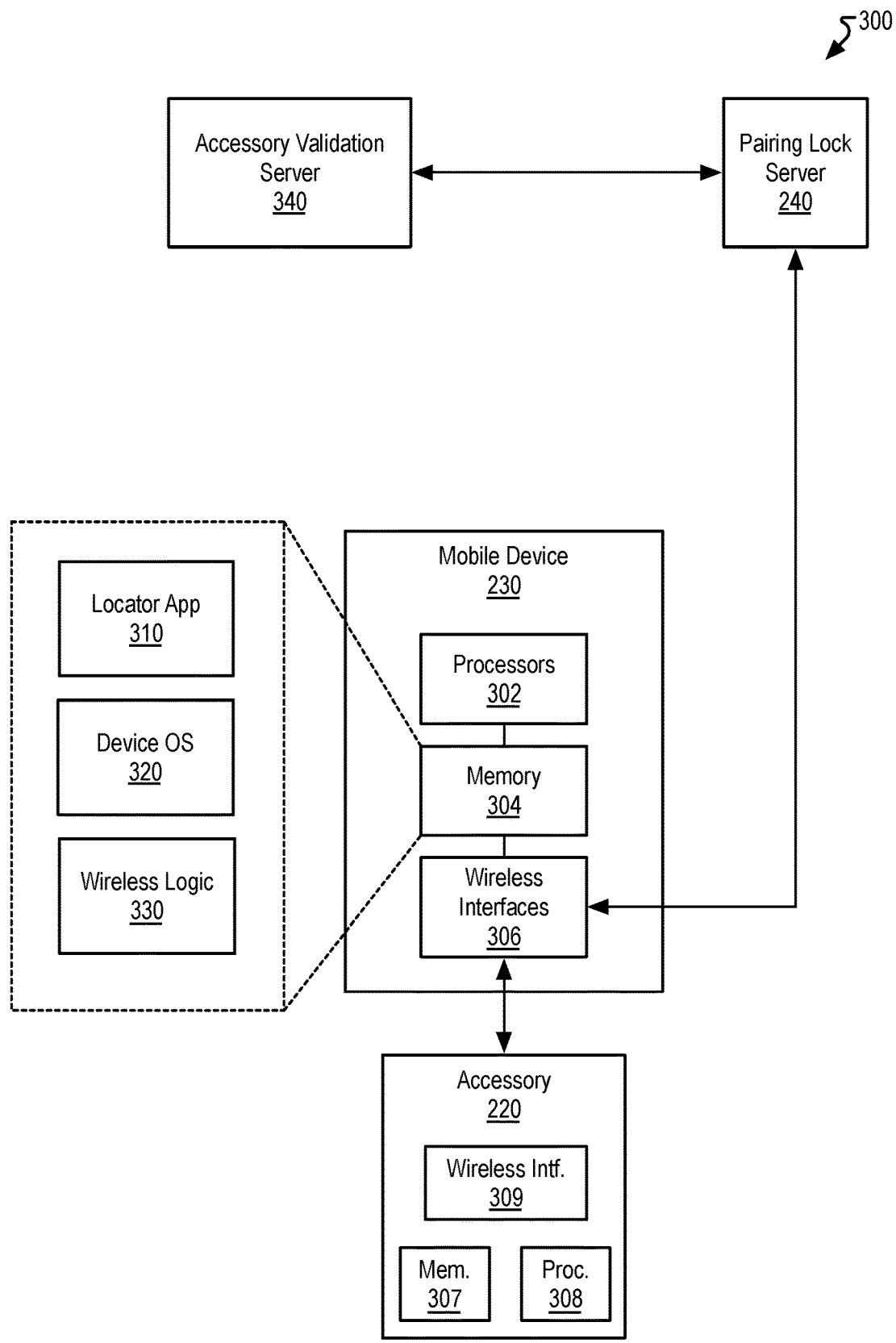
FIG. 3 illustrates a system to enable server-mediated pairing between a trusted accessory and a mobile device.

FIG. 3 illustrates a system 300 to enable server-mediated pairing between a trusted accessory and a mobile device. The system 300 can be configured to perform operations associated with the sequence diagram of FIG. 2. In one embodiment the system 300 includes the mobile device 230 and the wireless accessory 220, which are in communication with the pairing lock server 240. For third-party accessories, the pairing lock server 240 can communicate with an accessory validation server 340, which enables the pairing lock server 240 to verify that the accessory 220 is a genuine accessory device that is registered with the vendor of the crowdsourced locator service and is authorized to participate in the functionality provided by the service. In one embodiment, validation of first-party accessories may be performed directly by the pairing lock server 240, or may also be performed via the accessory validation server 340. In one embodiment the accessory 220 includes a wireless interface 309, memory 307, and a processor 308. The mobile device can include a set of processors 302, memory 304, and a set of wireless interfaces 306. The memory 304 of the mobile device 230 can include program code to enable a locator application 310, a device operating system (OS) 320, and wireless logic 330 to manage the wireless interfaces 306.

The mobile device 230 can communicate with the accessory 220 via a wireless interface in the set of wireless interfaces 306, such as but not limited to a Bluetooth or BLE interface. The wireless interface 309 of the accessory 220 is an interface having support for Bluetooth, BLE, or another short range wireless protocol supported by the wireless interfaces 306 of the mobile device 230. The mobile device 230 can communicate with the pairing lock server 240 via another interface in the set of wireless interfaces 306, such as a Wi-Fi interface or a mobile data interface associated with a mobile wireless data (e.g., cellular) network. The pairing lock server 240 can communicate with an accessory validation server 340 via a local network if the servers are co-located, or a wire-area network if the servers are not co-located.

The processors 302 of the mobile device 230 may be a single-multi-core processor, multiple single-core processors, or a plurality of multi-core processors. One or more of the processors 302 can be application processors that execute program code within and/or read from memory 304. The memory 304 can include system memory having a variety of address spaces in which program code is executed. The memory 304 can also include non-volatile memory to persistently store data, including data to store pairing data for a completed pairing process with the accessory 220. The accessory 220 can also include memory 307 and a processor 308. The memory 307 can be include multiple memory devices, including volatile and non-volatile memory devices. A non-volatile region of the memory 307 can store a software token that can be used to validate the accessory 220 during the pairing process, while a volatile region of the memory 307 can be used to execute program logic to perform the pairing process and to enable normal operation of the accessory 220 after pairing. In one embodiment the processor 308 is a low power processor of a system on a chip (SoC) integrated circuit, which can also include the memory 307. In one embodiment, the processor 308 is a microcontroller that executes firmware logic stored on the memory 307. The pairing process between the mobile device 230 and the accessory 220 can be initiated by a user of the mobile device 230 via an interface provided by the locator app 310. The device OS 320 includes core operating system logic. The operating system logic of the mobile device OS 320 can include device driver and utility logic to manage the wireless interfaces 306 of the mobile device 230. The device driver and utility logic can include the wireless logic 330. The mobile device OS 320 can include software components configured to handle the secure pairing process, such as a secure pairing daemon (SPD). In one embodiment, the SPD can be used to perform any of the operations that are described as being performed by the mobile device OS 320. The locator app 310 can facilitate communication between the locator app 310 and the accessory validation server 340 during the pairing process and to facilitate communication with the accessory 220 after pairing is complete.

FIG. 4A-4M are sequence diagrams of an end-to-end view of the pairing lock process. An end-to-end view of the pairing process described herein includes interaction between the locator app 310, the mobile device OS 320, and the wireless logic 330 of the mobile device 230 with the accessory 220 and the pairing lock server 240. The pairing lock server 240 can communicate with the accessory validation server 340. An encrypted communication channel can also be established between the accessory validation server 340 and the accessory 220 to enable encrypted data to be exchanged between the accessory 220 and the accessory validation server 340 via a data relay facilitated by the pairing lock server 240 and the mobile device 230. Data exchanged between the accessory 220 and the accessory validation server 340 via this channel cannot be viewed or extracted by the mobile device 230, as the cryptographic material that underlies this communication channel is not visible or exposed to the mobile device 230.

Figure 4A:
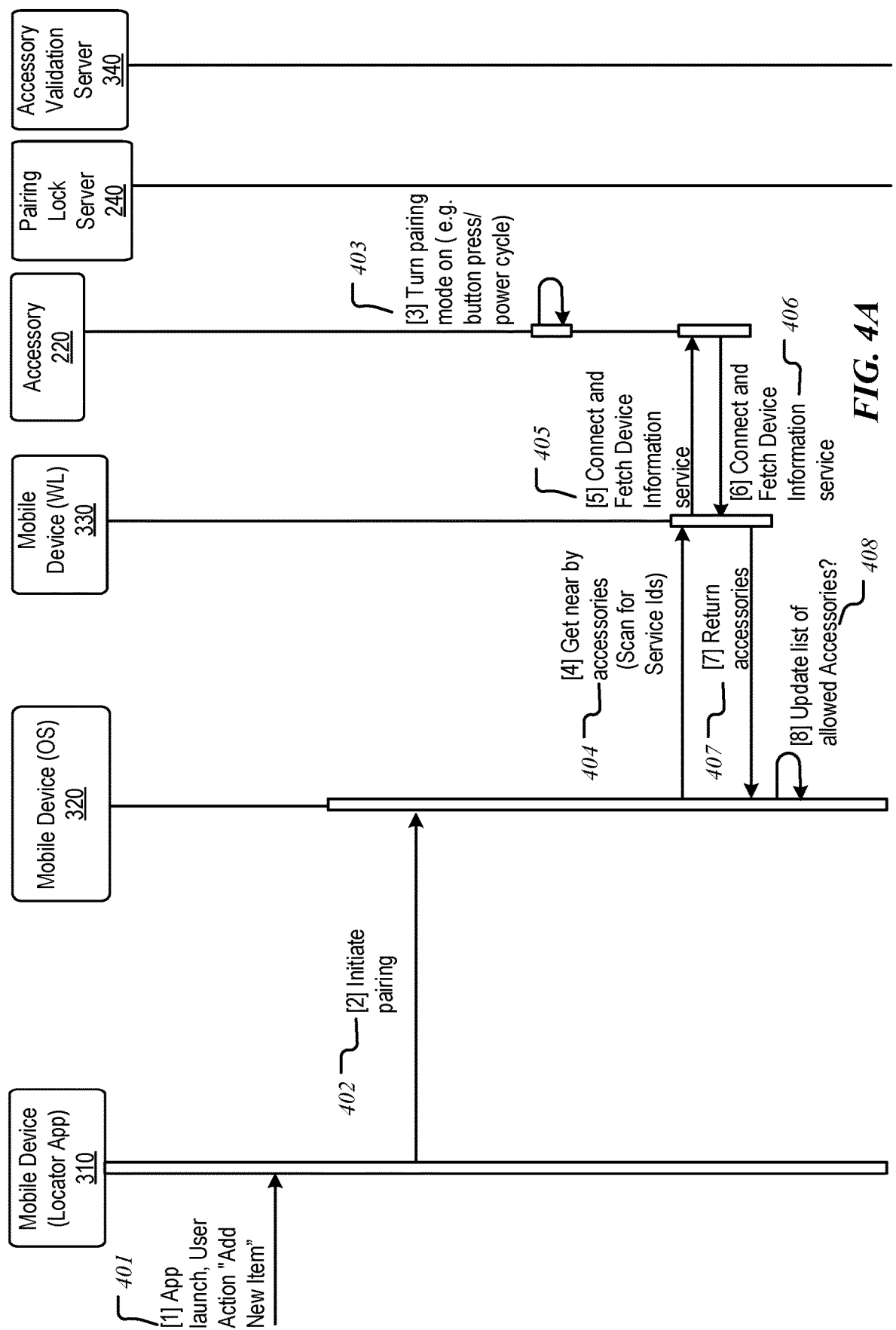

As shown in FIG. 4A, the operations can begin in response to an app launch action at locator app 310 to add a new item (401). Before a new item is added, the SPD can query an account status for the cloud services account to which the accessory is to be paired to determine if a minimum level of security is enabled for the account. In one embodiment, an error code can be displayed if the account requires a security upgrade, for example, to enable two factor authentication (2 FA), or the locator app 310 can prompt the user to enable those features. The locator app 310 can send a message to initiate pairing (402) after the SPD determines that the account associated with the mobile device is properly configured to enable a pairing lock. Additionally, an action (403) to enable pairing mode can be performed with the accessory 220, such as pressing a button on the accessory 220 or power cycling the accessory 220. In one embodiment, an explicit physical action may be required as an indication of user intent to enable a pairing mode that enables the accessory to be paired for use with the crowdsourced locator service. If the accessory 220 enters pairing mode but pairing does not begin, a timeout may occur and the accessory will exit pairing mode.

The mobile device OS 320 can then perform an operation (404) to scan for nearby accessories by scanning by service identifiers that are broadcast by those accessories in wireless advertisement packets. The mobile device can asynchronously detect and pair with multiple accessories concurrently. The pairing process can begin with a first accessory while data is fetched for other accessories. The wireless logic 330 can connect and fetch (405) from a device information service on accessory 220. In turn, the accessory 220 can connect (406) and fetch from a device information service provided by the wireless logic 330 on the mobile device. The wireless logic 330 can return (407) data to the mobile device OS 320 for the accessory 220 and any other detected accessories for which pairing is to be performed. The mobile device OS 320 can determine (408) if an update to the allowed list of accessories should be performed. An update can be performed if the previously retrieved list is older than a threshold age, or if the list does not include one or more accessories for which pairing operations are to be performed.

Figure 4B:
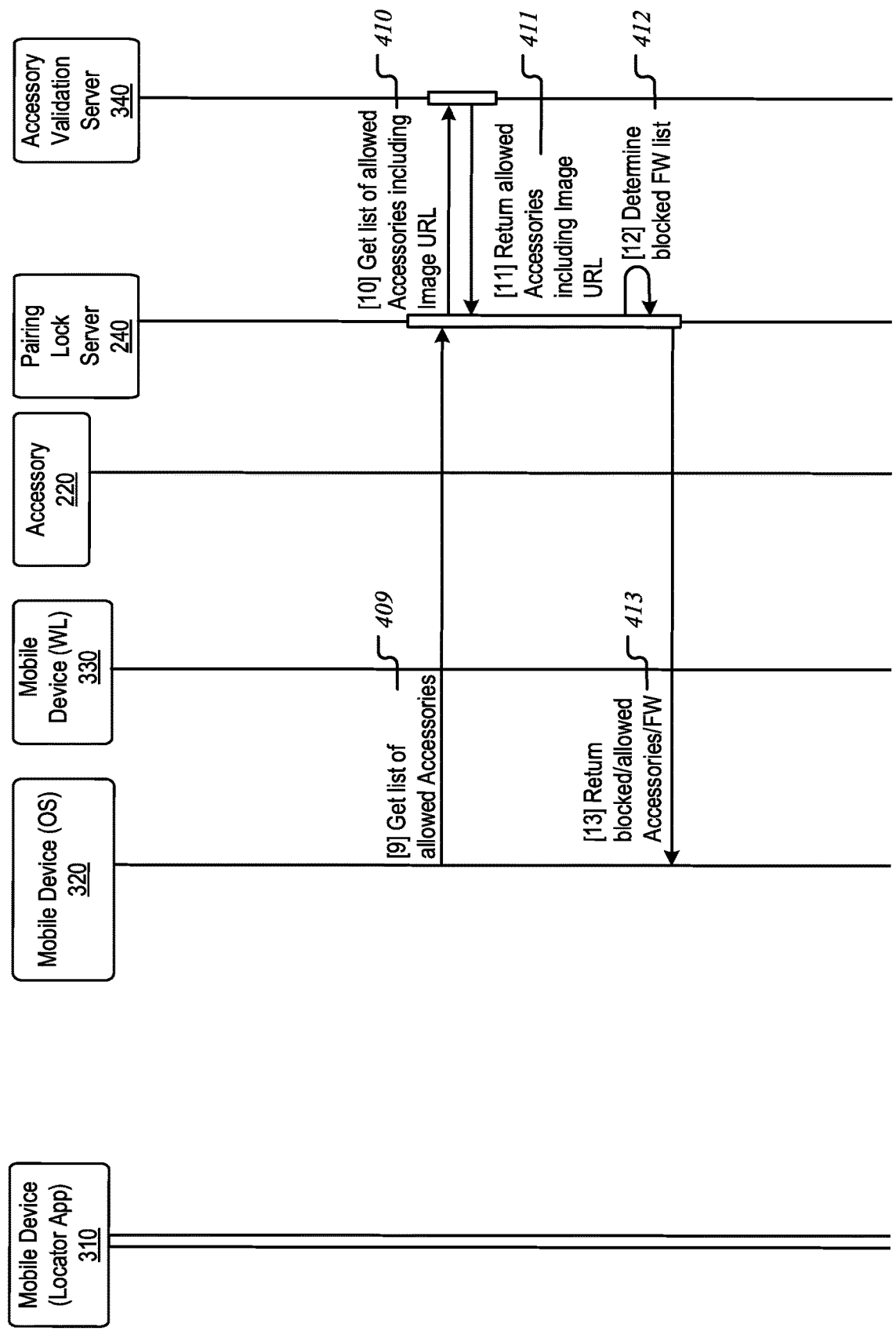

As shown in FIG. 4B, if an update to the allowed list of accessories is to be acquired, the mobile device OS 320 can acquire (409) an updated list of accessories from the pairing lock server 240. The pairing lock server 240 can acquire (410) an updated list of allowed accessories, including an image URL for each accessory from accessory validation server 340. For an accessory to be paired, the locator app 310 can fetch the image of the device via the image URL and display an image of the device to the user via a pairing interface presented via the locator app 310. The accessory validation server 340 can then return (411) the updated list of allowed accessories, including an image URL to display for the respective accessories in the list. The accessory validation server 340 can also return a list of accessories, if any, that have been added to a blocked accessories list. Additionally, the pairing lock server 240 can determine (412) if any allowed accessories have blocked firmware versions that should be updated by those accessories. The pairing lock server 240 can then return (413) a list of blocked and allowed accessories, including blocked firmware versions. The mobile device OS 320 can then confirm the completeness of the list of details to use to complete the pairing process (e.g., Model Info/Product Name, Color, Image URL/Default Image, RoleId mapping).

As shown in FIG. 4C, the mobile device OS 320, for example, via the SPD, can review the list of allowed accessories (414) and determine if the accessory to be paired is on the list. In one embodiment, if the accessory is completely unrecognized, the pairing process cannot continue. If the accessory is recognized but not on the list of allowed accessories (or is on the list of blocked accessories), an error can be returned to the locator app 310. If the accessory is recognized but the firmware version is unrecognized or is on the blocked list, an error can be displayed to the user and the accessory can be registered (415) for a firmware update. Additionally, if pairing is allowed the locator app 310 can fetch an image asset based on the image URL provided for the accessory and display the image of the accessory to the user via the user interface of the application. If pairing is allowed and the user elects to continue pairing, the mobile device OS 320 can generate (416) a SessionNonce for use in generating cryptographic material for use in the pairing process. The mobile device OS 320 can then generate (417) an Encrypted Identity (E1=encrypted_dsid) to bind the pairing session to the user that has initiated the pairing request. In one embodiment, mobile device OS 320 can add the owner device attestation public key into E1 to bind session to the specific mobile device that has initiated the pairing. Once the pairing data is bound, the data cannot be extracted for use by a different user and/or mobile device.

Figure 4D:
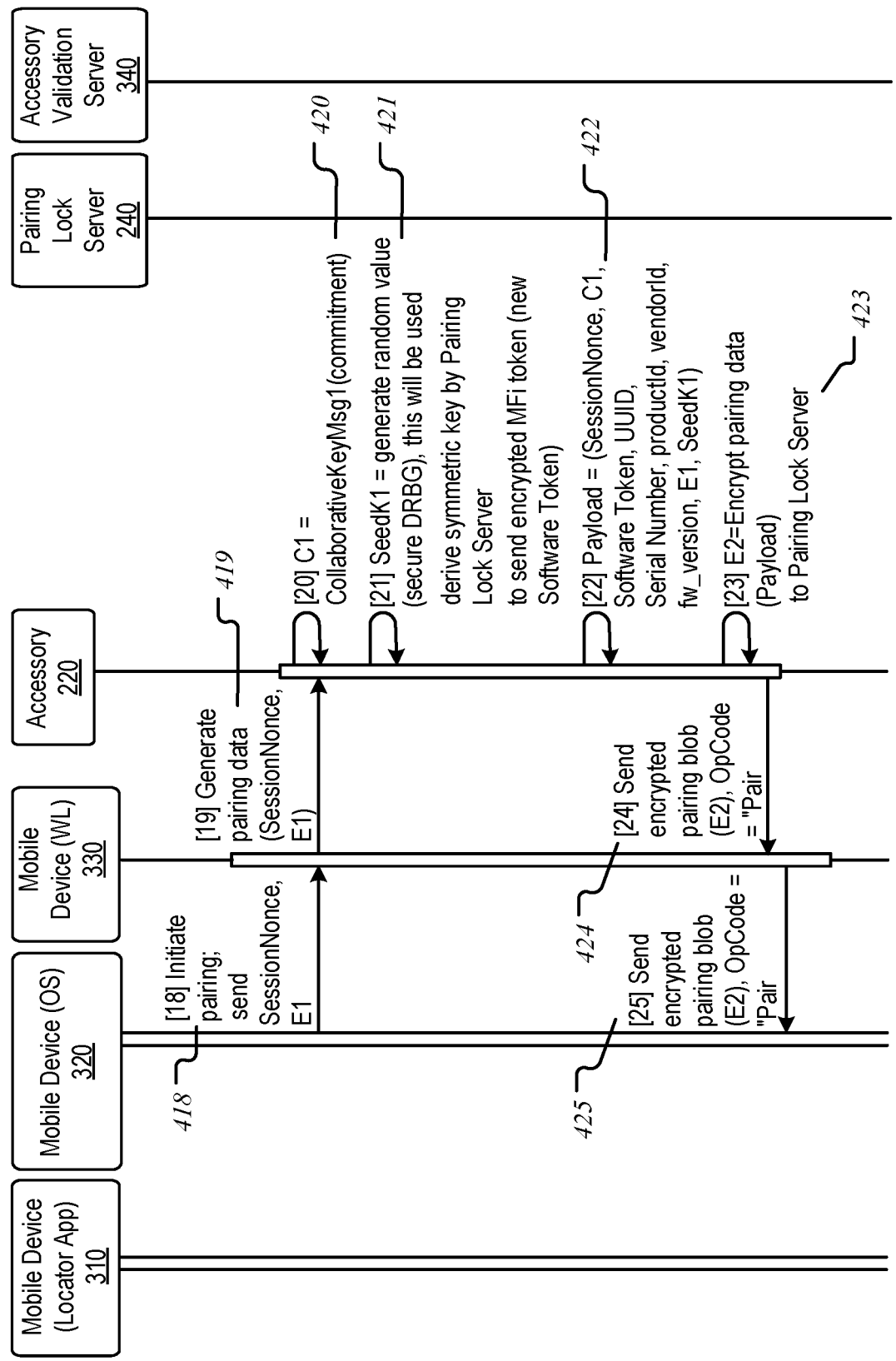

As shown in FIG. 4D, to initiate the pairing process, the mobile device OS 320 can send (418) the SessionNonce and E1 to the wireless logic 330. The wireless logic 330 can then generate (419) pairing data (SessionNonce, E1) and send the pairing nonce to the accessory 220.

A series of operations can then be performed by the accessory 220. The operations performed by the accessory can include generating (420) a collaborative commitment value C1=CollaborativeKeyMsg1(commitment) for use in starting the pairing process. The C1 value is an initial commitment by the accessory 220 as part of the collaborative key generation process that is performed by the accessory 220 and the mobile device 230. In one embodiment, C1 is a hash value that is generated based on an elliptic curve scalar value s and a random value r, and C1=SHA-256(s||r). The operations additionally include generating (421) SeedK1, which is random value generated via a secure deterministic random bit generator (DRBG). SeedK1 can be used by the pairing lock server 240 to derive a symmetric key that is used to encrypt a new software token that will be provided to the accessory after the pairing process is complete. The accessory 220 can then generate (422) a payload to send to the mobile device. In one embodiment, the generated payload=(SessionNonce, C1, Software Token, UUID, Serial Number, productId, vendorId, fw_version, E1, SeedK1). The accessory 220 can then generate (423) encrypted pairing data E2, where E2=Encrypt pairing data (Payload). Encrypted pairing data E2 is an encrypted pairing blob that is encrypted for transmission to the pairing lock server 240, where the pairing boob will be decoded by the pairing lock server 240 and verified. The accessory 220 can then send (424) the encrypted pairing blob (E2) and "Pair" opcode to the wireless logic 330. The wireless logic 330 can then send the (425) encrypted blob received from the accessory 220 to the mobile device OS 320.

Figure 4E:
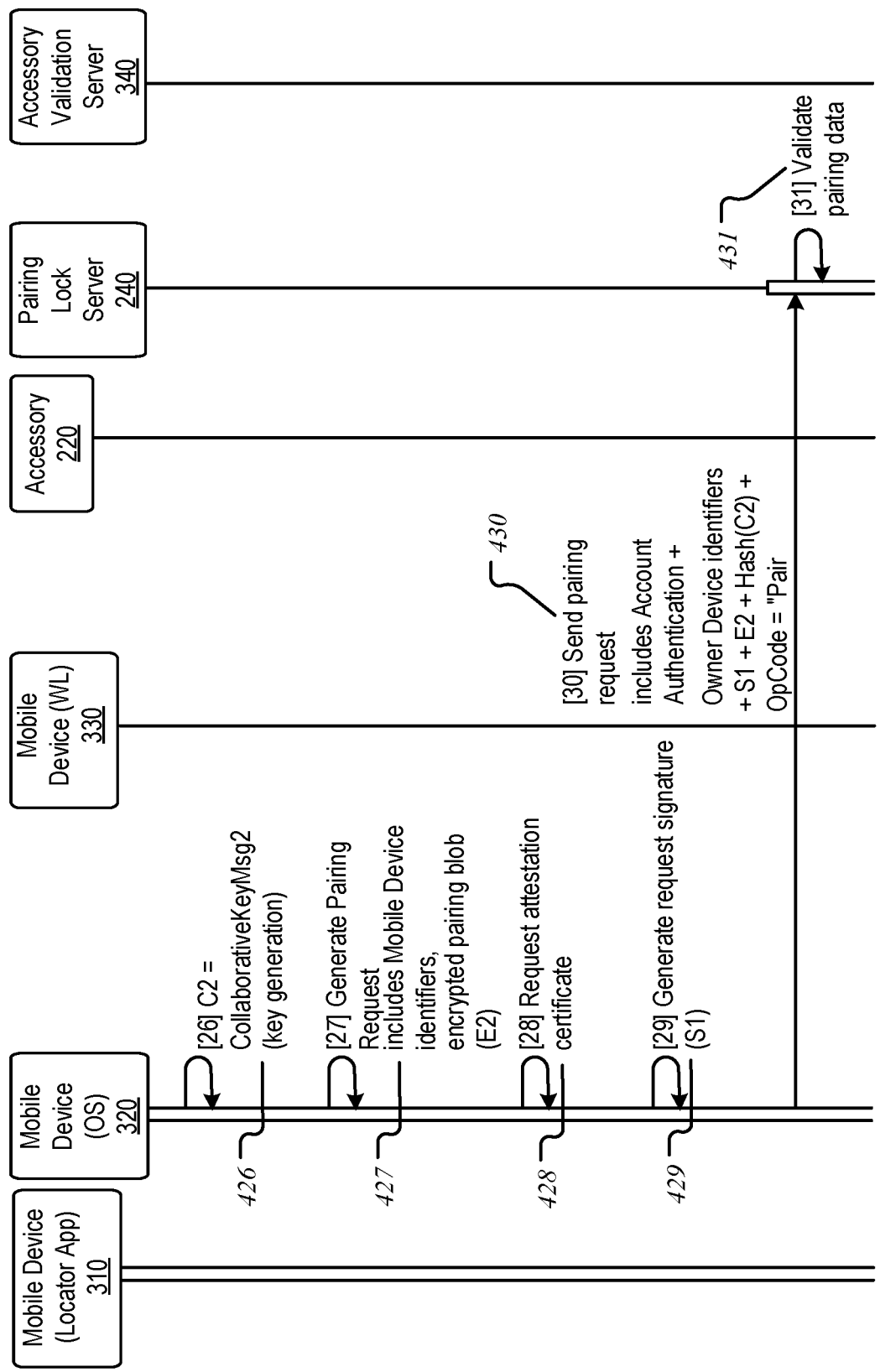

As shown in FIG. 4E, the mobile device OS 320 can perform a series of operations upon receipt of the encrypted blob from the wireless logic 330. In one embodiment, the mobile device OS 320 can generate (426) encryption data C2, where C2=CollaborativeKeyMsg2(key generation). C2 is part of the collaborative key generation process that is performed by the accessory 220 and the mobile device 230. In one embodiment, C2 is a hash value that is generated based on an elliptic curve scalar value s' and a random value r'. The mobile device OS 320 can then compute S'=s' G, where G is an elliptic curve generator base point. C2 can then be computed as C2=(S'||r'). The values within C2 will later be checked by the accessory 220 before pairing is finalized and pairing will be aborted if C2 is incorrect. The mobile device OS 320 can then generate (427) a pairing request that includes identifiers for the mobile device 230 and encrypted pairing blob (E2).

The mobile device OS 320 can then request (428) an attestation certificate to attest to the validity of the mobile device, for example, from an attestation server that is remotely accessible to the mobile device OS 320. In one embodiment, the mobile device OS 320 can send attestation request data to the server, which can return an X509 certificate. The mobile device OS 320 can then request (429) generation of a signature (S1) for the pairing request, which can be generated via a secure processor of the mobile device and/or via the remote attestation server. The mobile device OS 320 can then send (430), to the pairing lock server 240, a pairing request to the pairing lock server 240 that includes an authentication token for the cloud services account to which the accessory 220 will be paired, as well as the mobile device identifiers, signature S1, encrypted pairing blob E2, a hash computed from value of C2, and the "Pair" opcode. The pairing lock server 240 can then validate (431) the pairing data, as shown in FIG. 4F-4H.

Figure 4F:
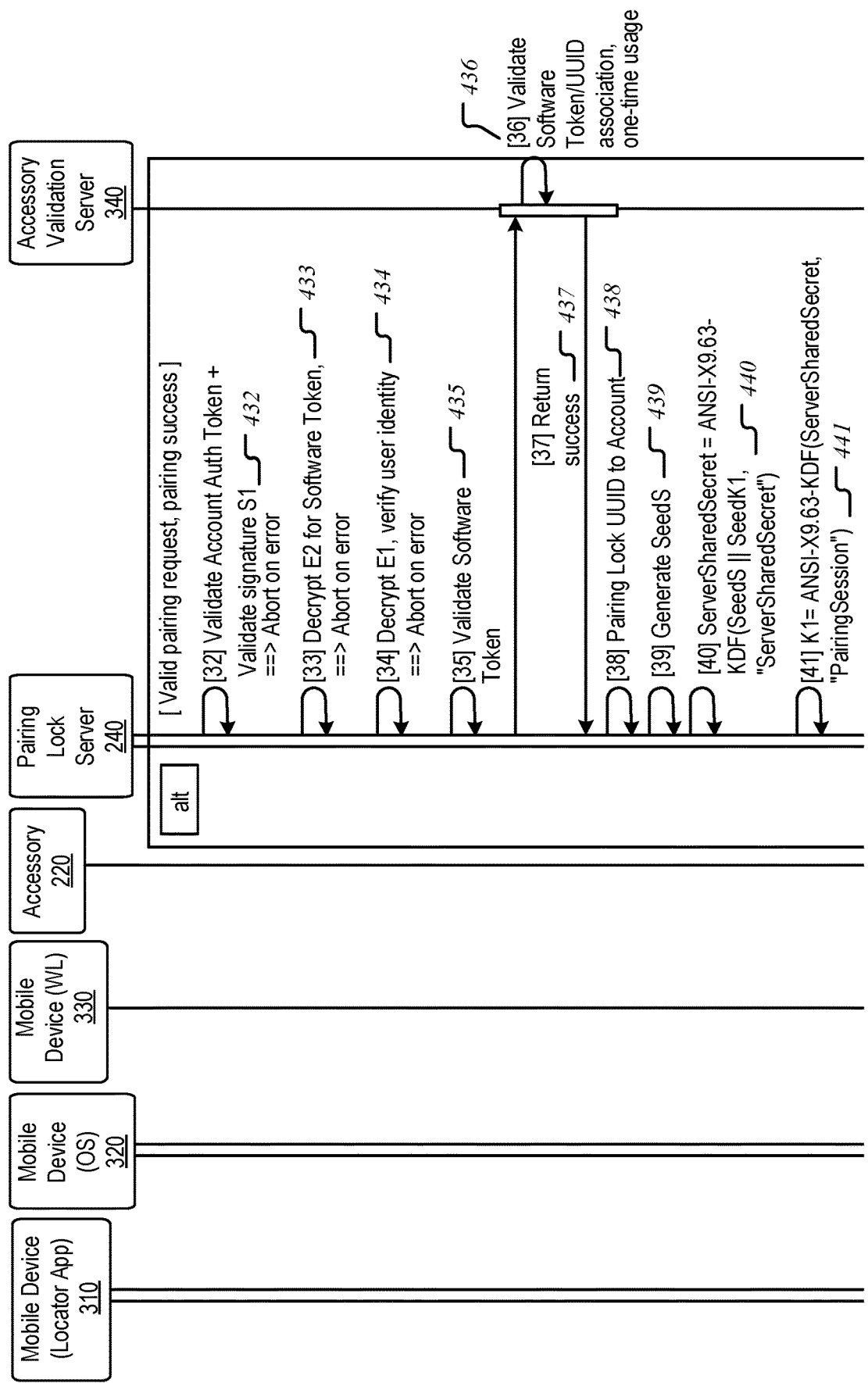
Figure 4G:
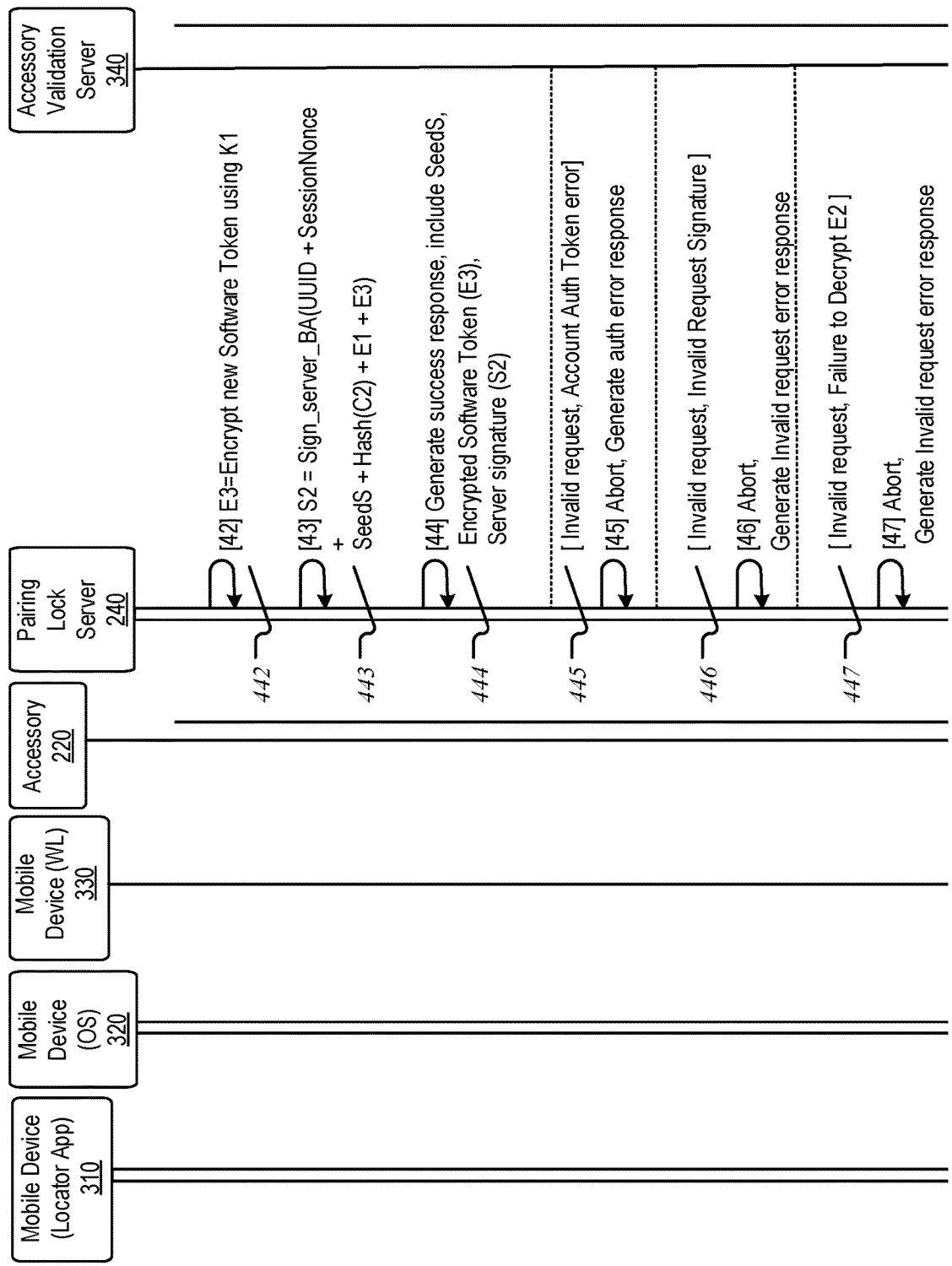
Figure 4H:
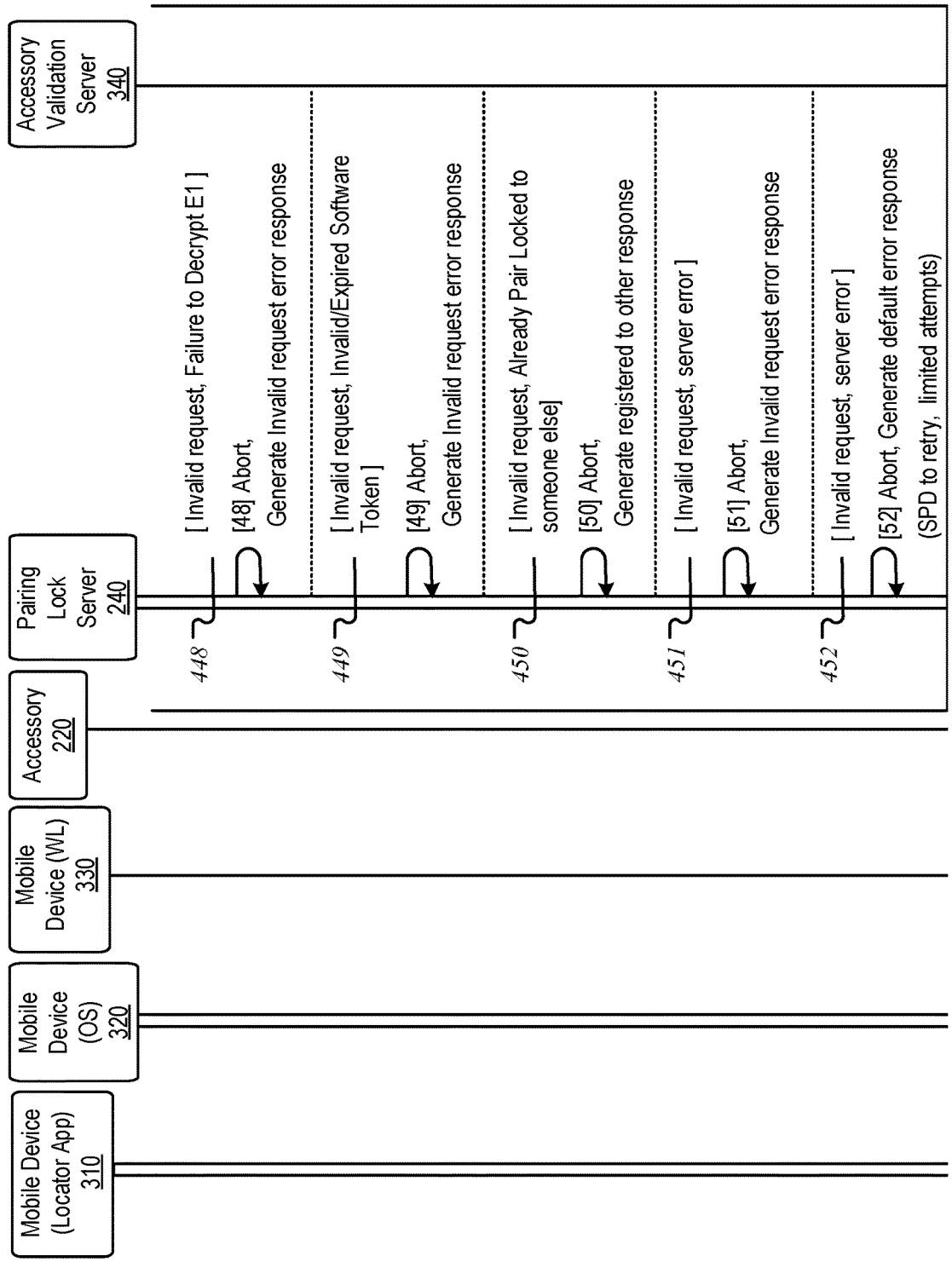

As shown in FIG. 4F-4G, the pairing lock server 240 can perform operations to validate the pairing data that include a first set of operations 432-443 that validate the various elements of the pairing data and generates a success response 444 in response to a successful validation. If a validation fails, the pairing lock server 240 can return various types of abort errors during operations 445-452 shown on FIG. 4G and FIG. 4H depending on the cause of the validation failure.

As shown in FIG. 4F, the pairing lock server 240 can validate (432) the account authorization token and signature S1 and will abort the pairing process upon failure of the validation of the account authorization token and generate an authentication error response (445). In response to the failure of the validation of request signature S1, the pairing lock server 240 can generate an invalid request signature error response (446). The pairing lock server 240 can then decrypt (433) pairing blob E2 to acquire the software token. The pairing lock server 240 can abort upon failure to decrypt E2 and generate an invalid request error response (447). The pairing lock server 240 then decrypts (434) Encrypted Identity E1. The pairing lock server 240 will abort upon failure to decrypt E1 and can generate an invalid request error response (448) upon failure to decrypt E1.

To validate (435) the software token, the pairing lock server 240 can send the software token to the accessory validation server 340 for validation. The accessory validation server 340 performs operations (436) to determine that the software token is a validly issued software token for the UUID of the accessory and that the software token has not been previously used. The accessory validation server 340 then returns (437) success if the token validation succeeds, and may return an error message if validation fails. If the software token validation fails, the pairing lock server 240 can generate an invalid request error if the software token is expired or invalid (449). The pairing lock server 240 may return a separate error message if the accessory validation server 340 indicated that the accessory 220 is already pairing locked to another account (450).

Upon successful validation of the software token, the pairing lock server 240 can lock the UUID of the accessory 220 with the account ID for the cloud services account to which the accessory 220 is to be paired (438). A server seed value SeedS value can then be generated (439) for one time usage and can be used, along with SeedK1 received from the accessory 220 in the pairing data, to generate a server shared secret value (440). A pairing session value K1 can then be generated based on the server shared secret (441). Value K1 can be derived by the accessory 220 based using SeedK1, but will not be known to the mobile device 230. A new encrypted software token E3 is generated by encrypting the new software token using K1 (442). In various embodiments, the new software token is generated by the pairing lock server 240 or received from the accessory validation server 340. The new software token is associated with the UUID of the accessory 220. In one embodiment, the association is a cryptographic association. A server signature S2 can be generated based on the UUID of the accessory, the session nonce, SeedS, a hash of C2, encrypted identity E1, and new encrypted software token E3 (443). A success response is then generated by the pairing lock server 240 that includes SeedS, new encrypted software token E3, and server signature S3 (444). If a server error occurs during validation, the pairing lock server 240 may generate an invalid request error response (451). For some transient server errors, the pairing lock server 240 may generate a default error response (452). The SPD on the mobile device may retry the pairing attempt for a limited number of times.

Figure 4I:
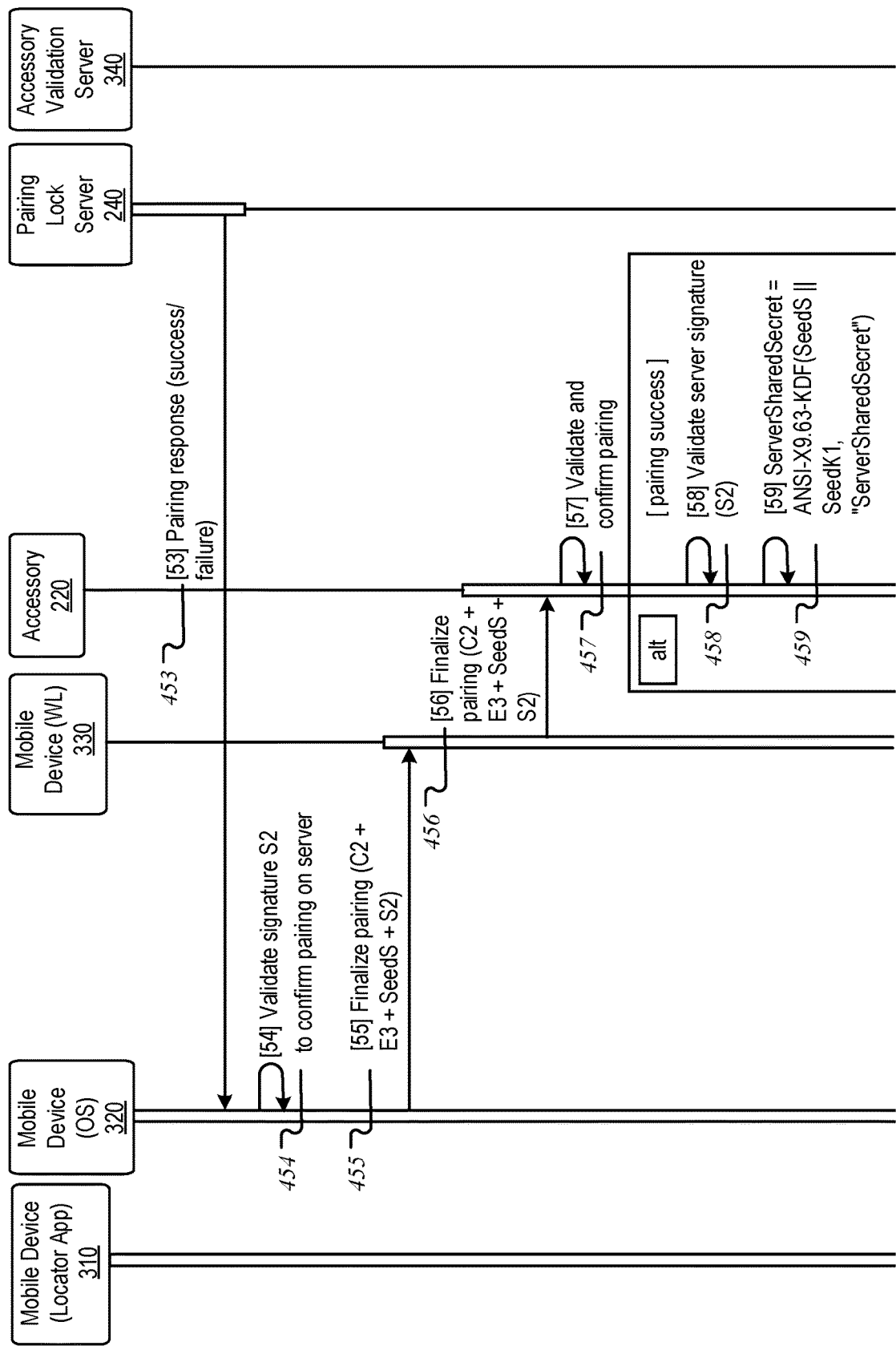

As shown in FIG. 4I, the pairing lock server 240 can return (453) a pairing response success or failure to the mobile device OS 320. If the pairing process was a success, the mobile device OS 320 can validate (454) signature S2 to confirm the success of the pairing process on server. The mobile device OS 320 can then send a message to the wireless logic 330 to finalize (455) the pairing with the accessory, which includes C2, E2, SeedS, and S2. The wireless logic 330 can then send (456) the finalize pairing (C2+E3+SeedS+S2) message to the accessory 220, which can then validate and confirm the pairing (457) using a series of operations that validate the pairing data received from the mobile device 230, as well as the authenticity of the pairing lock server 240. Validation operations performed by the accessory 220 include an operation (458) to validate server signature S2. If the server signature is valid, the accessory 220 can then perform an operation (459) to re-generate the per-session server shared secret that was generated by the pairing lock server 240.

Figure 4J:
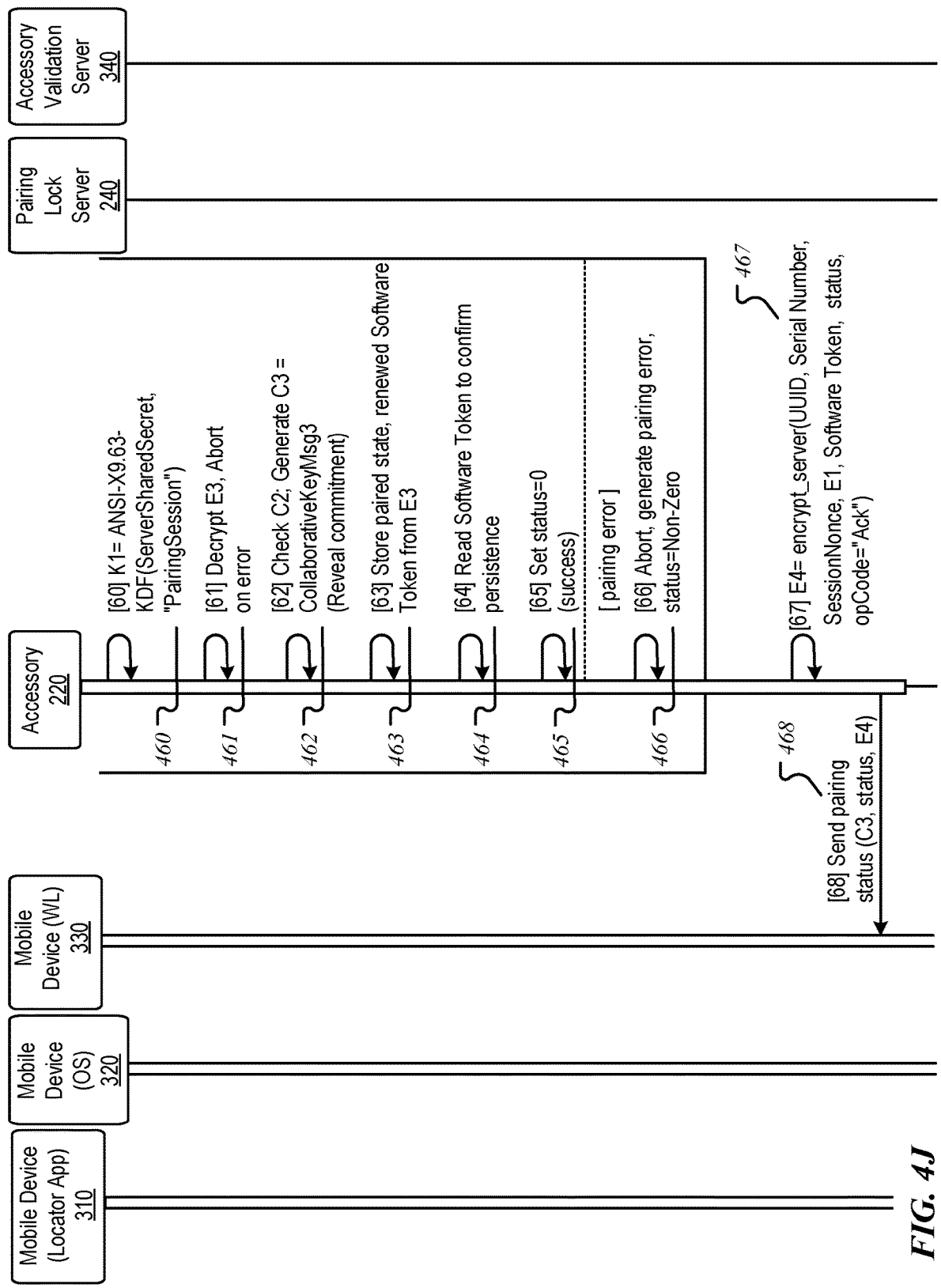

As shown in FIG. 4J, the operations on the accessory 220 continue with an operation (460) to generate value K1 based on the per-session server shared secret. The accessory 220 can then perform an operation (461) to decrypt the new encrypted software token E3, and can abort upon failure to decrypt E3. The accessory 220 can then continue the collaborative key generation process by performing an potation (462) to check the value of C2 and, if C2 is valid, generating cryptographic value C3=CollaborativeKeyMsg3(Reveal commitment). The accessory 220 can check C2, which includes S' and r' computed by the mobile device OS 320 in operation 426, by verifying that S' is a valid point on the elliptical curve. If valid, the accessory 220 can generate the final public key P=S'+s·G and generate C3={s,r}. The accessory 220 can then perform operations (463) to store a paired state for the accessory and the renewed software token received in E3 to nonvolatile storage. The accessory 220 can then read (464) the renewed software token to confirm that the token has been correctly persisted to storage. The accessory 220 can then set (465) the pairing return status to zero to indicate a successful pairing. In response to an error at any part of the validation, the accessory 220 can abort the paring and set the pairing status to a non-zero value that indicates the nature of the error (466). In one embodiment, the accessory 220 will return neither a success nor an error value in response to the request to finalize pairing unless a valid software token is provided in the request. The accessory 220 can then compute (467) encrypted value E4 to for relay to the pairing lock server 240, where E4=encrypt_server(UUID, Serial Number, SessionNonce, E1, Software Token, status, opCode="Ack"), to acknowledge receipt of server data by the accessory 220. The accessory 220 can then perform an operation (468) to send the paring status to the wireless logic 330 of the mobile device OS 320. The pairing status can include the value C3, status, and encrypted blob E4.

Figure 4K:
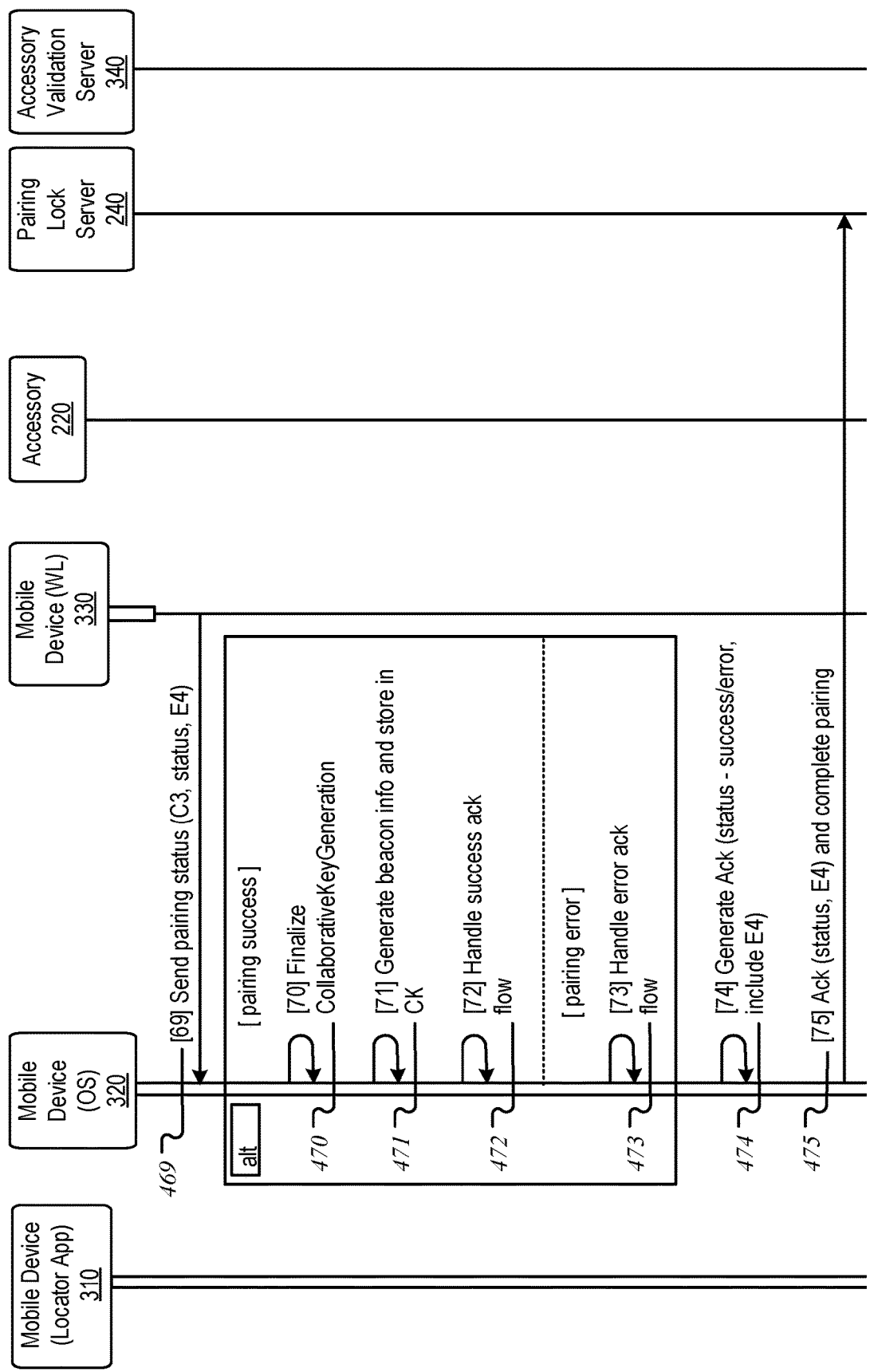

As shown in FIG. 4K, the wireless logic 330 on the mobile device can perform an operation (469) to send or relay the pairing status data (C3, status, E4) to mobile device OS 320. The pairing status data can then be processed by the SPD in operations 470-473. The SPD of the mobile device OS 320 can perform an operation (470) to finalize the collaborative key generation process by validating the value s as a valid point on the elliptic curve selected for the cryptographic system in use and also verifying that C1=SHA-256(s∥r). Cryptographic material to determine beacon advertisement information to be broadcast by the accessory 220 is then generated and stored via command key CK (471). Command key CK can then be used to enable the mobile device 230 to connect to the accessory 220. The mobile device OS 320 can then perform operations (472) to handle the success acknowledgement task flow. Should any error occur, the SPD can perform (473) the error acknowledgement task flow. The mobile device OS 320 can then generate an acknowledgement message that indicates the current status of the pairing process (success/error) and includes include encrypted blob E4 (474). The acknowledgement message can then be sent to the pairing lock server 240 to complete pairing (475).

Figure 4L:
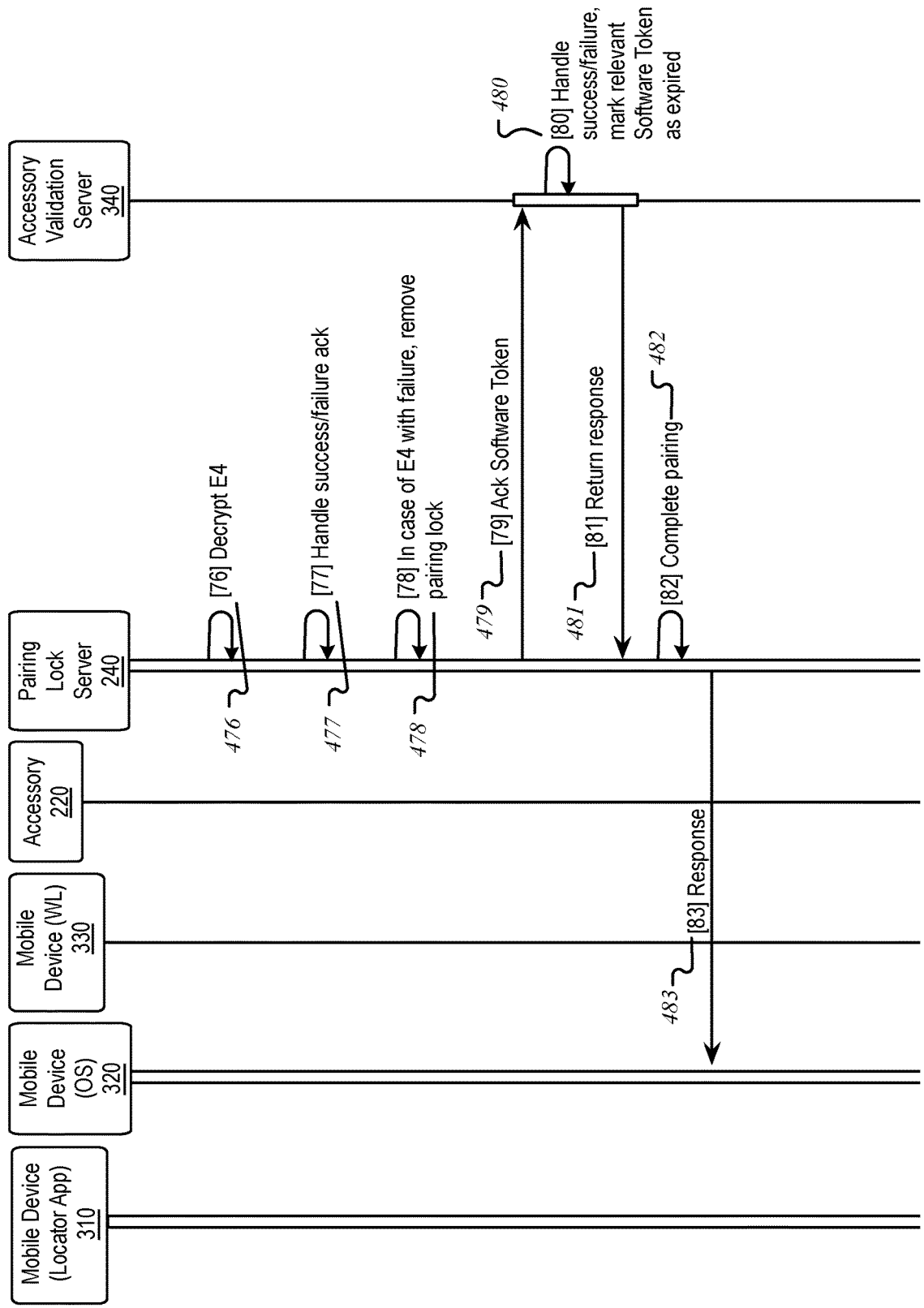

As shown in FIG. 4L, operations performed on the pairing lock server 240 include to decrypt encrypted blob E4 (476) and handle the success or failure acknowledgement message (477). If encrypted blob E4 indicates a failure has occurred, the data that memorializes the pairing lock between the mobile device 230 and the accessory 220 is removed (478). In the event that the pairing lock server 240 does not receive E4, the pairing process may enable a future pairing lock to be performed to another account if a successful software token authentication is performed. Additionally, as forced unpair operation is supposed for non-functional or unconnected accessories. The pairing lock server 240 can then send an acknowledgement message for the software token to accessory validation server 340 (479). The accessory validation server 340 can then handle the success or failure of the operation and mark the relevant software token as expired based on whether the pairing process has failed or succeeded (480). The accessory validation server 340 then returns (481) a response to the pairing lock server 240, which causes the pairing lock server 240 to complete the server portion of the pairing process (482). The pairing lock server 240 sends a response to mobile device OS 320 to indicate that the pairing is complete (483).

Figure 4M:
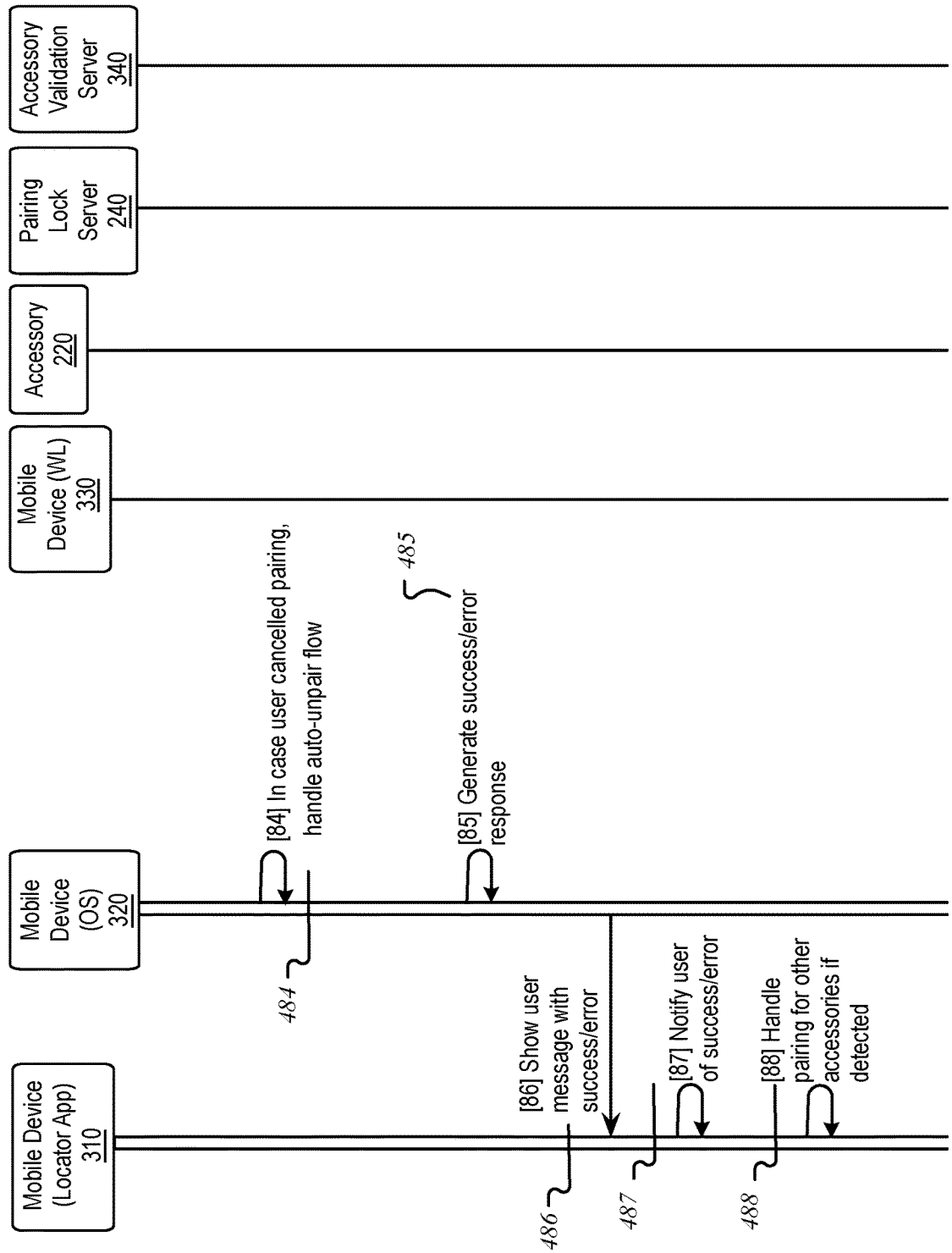

As shown in FIG. 4M, operations performed the mobile device OS 320 to finalize the pairing flow include to handle an automatic unpair logic flow in the event that the user cancels pairing (484) and to generate a success or error response (485). The mobile device OS 320 can send a request to the locator app 310 to display a success or error message to the user (486). The locator app 310 can then show a success or error user message via the user interface of the application (487). If other accessories were detected in a ready to pair state, the locator app 310 can handle pairing for those accessories (488). In one embodiment, the data generation and exchange for the pairing operations for the additional accessories are performed in parallel with the operations that are performed for the accessory 220. As understood by those skilled in the art, adjustments on the above process can be made within the spirit and scope of the techniques disclosed herein. Accessories that are paired via the secure paring and pairing lock technique can become eligible for use with various services described above with respect to FIG. 1.

Figure 5:
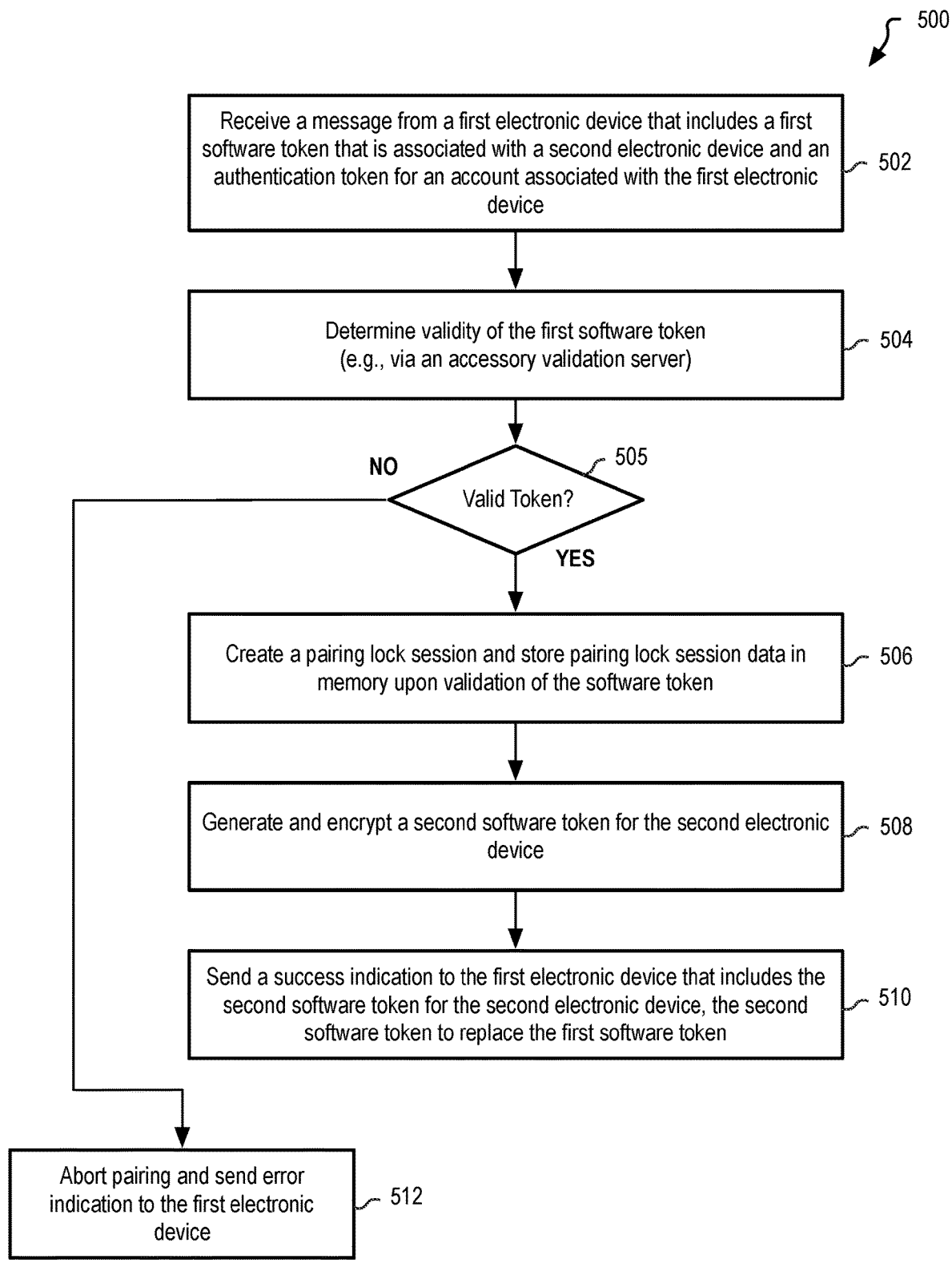
FIG. 5 illustrates a method to perform secure pairing on a sever device.

FIG. 5 illustrates a method 500 to perform secure pairing on a sever device. The method 500 can be performed by a pairing lock server 240 to lock a pairing between an accessory 220 and a mobile device 230. According to the method 500, a server device performs an operation (502) to receive a message from a first electronic device (e.g., mobile device 230) that includes a first software token that is associated with a second electronic device (e.g., accessory 220). The message from the first electronic device can also include an authentication token for an account associated with the first electronic device. The account can be, for example, a cloud services account that facilitates the services described in FIG. 1. The server device can then perform a set of operations (504) to determine validity of the first software token. Determining the validity of the first software token can include sending the first software token to an accessory validation server (e.g., accessory validation server 340) for validation. The accessory validation server can verify that the software token is valid, that the software token is associated with the UUID of the accessory, and that the software token has not been previously used to perform a pairing lock. If the software token is invalid ("No", 505), the server can abort the pairing process and send an error indication to the first electronic device (512). If the software token is valid ("Yes", 505), the pairing process can continue.

Upon validation of the software token, the pairing process continues with the server device performing an operation (506) to create a pairing lock session and to store pairing lock session data in memory. The pairing lock session data memorializes the pairing lock between the accessory and the account associated with the electronic device. Successful completion of the pairing lock enables the accessory device to be used by any electronic device that is authenticated with the account to which the accessory is locked. However, the accessory will be prevented from pairing with an electronic device that is not associated with the account to which the accessory is locked without the authorization of a user of the account. Should the pairing process fail at a later point, the pairing lock session data will be deleted.

In one embodiment, the method 500 additionally includes an operation to generate and encrypted a second software token for the second electronic device (508). The second software token is encrypted in a manner that enables the accessory device to decrypt the second software token without enabling the electronic device to access the second software token. The sever can then send a success indication to the first electronic device that includes the (encrypted) second software token for the second electronic device (510). As the first software token is a one-time use token, the second software token will replace the first software token on the accessory device.

Figure 6:
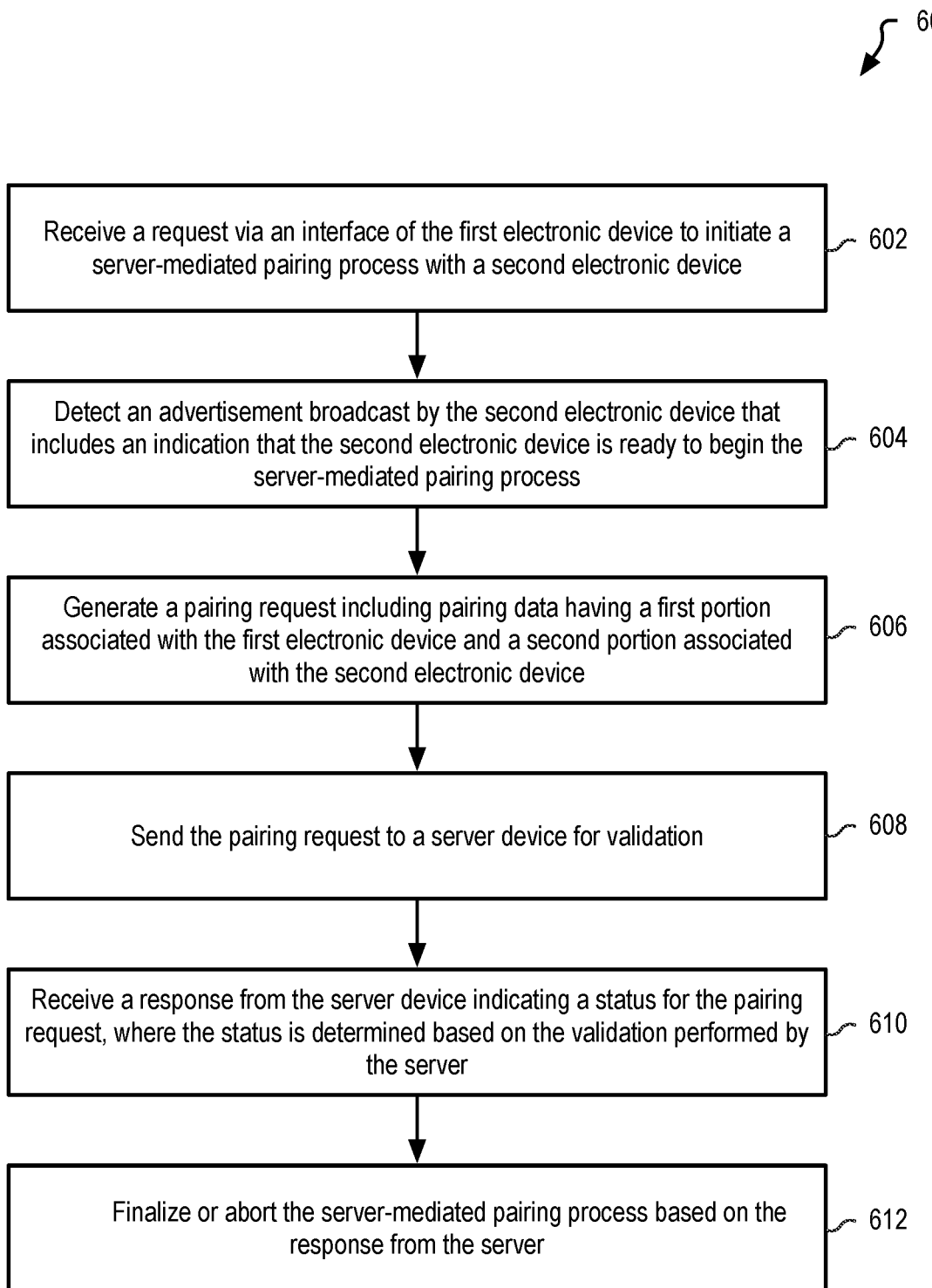
FIG. 6 illustrates a method to perform secure pairing on a mobile device.

FIG. 6 illustrates a method 600 to perform secure pairing on a mobile device. The method 600 can be performed by components of a mobile device 230 to pair with an accessory 220 via a pairing lock server 240. In one embodiment, a first electronic device (e.g., mobile device 230) can perform operations (602) that include to receive a request via an interface of the first electronic device to initiate a server-mediated pairing process with a second electronic device (e.g., accessory 220). The first electronic device can then detect an advertisement that is broadcast by the second electronic device that includes an indication that the second electronic device is ready to begin the server-mediated pairing process (604). In one embodiment, the ready to pair advertisement is detected before the option to pair is presented via the user interface of the first electronic device. The first electronic device can then generate a parting request including pairing data having a first portion associated with the first electronic device and a second portion associated with the second electronic device (606). The first electronic device can then send the pairing request to a server device for validation (608). The first electronic device can then receive a response from the server device indicating a status for the pairing request, where the status is determined based on the validation performed by the server (610). The first electronic device will then finalize or abort the server-mediated pairing process based on the response from the server (612).

Figure 7:
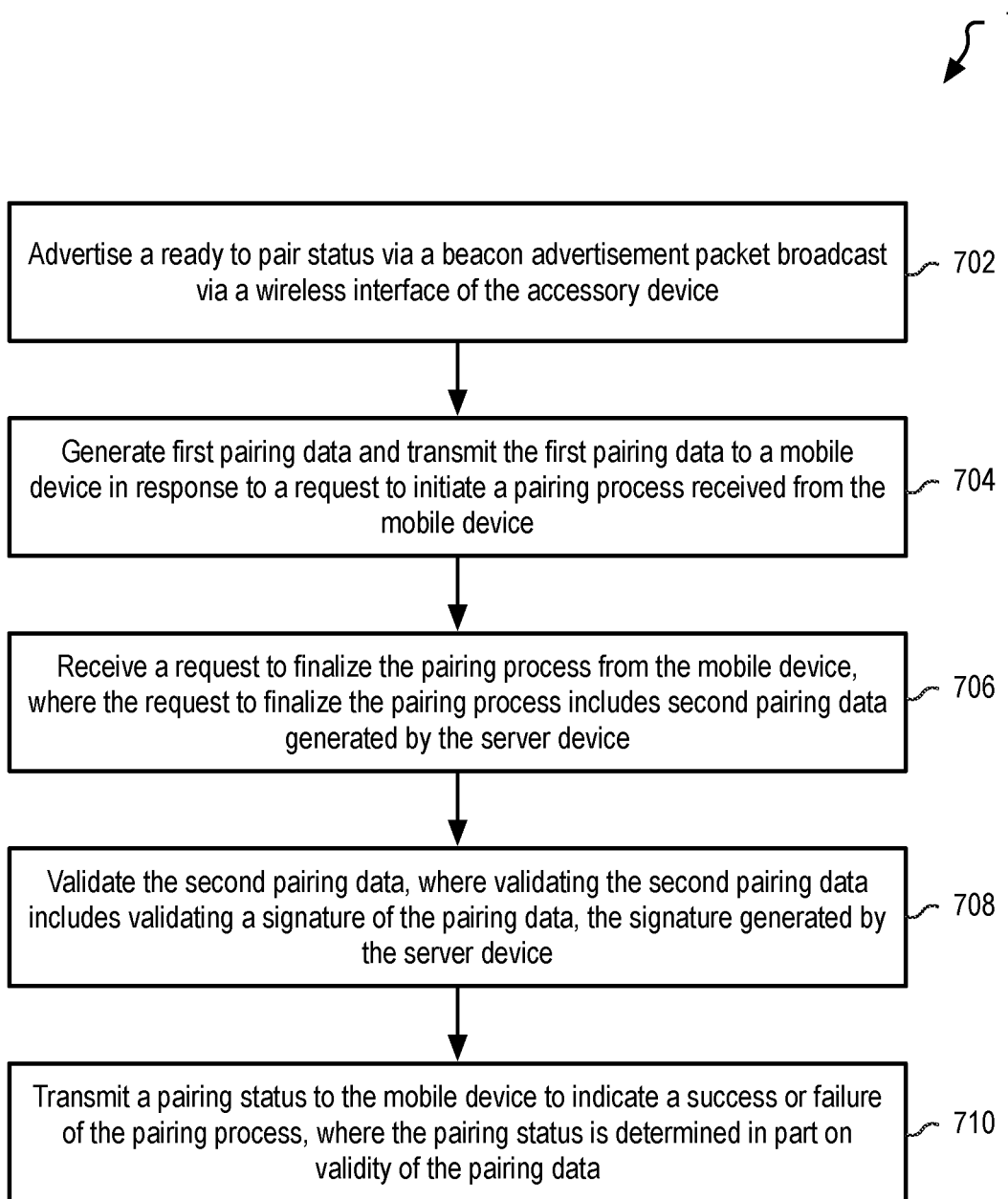
FIG. 7 illustrates a method to perform secure pairing on an accessory device.

FIG. 7 illustrates a method 700 to perform secure pairing on an accessory device. The method 700 can be performed by an accessory 220 to pair with an account to which an electronic device is authenticated. In one embodiment, the method 700 includes operations in which the accessory device advertises a ready to pair status via a beacon advertisement packet broadcast via a wireless interface of the accessory device (702). The accessory device can then generate first pairing data and transmit the first pairing data to a mobile device in response to a request to initiate a pairing process received from the mobile device (704). The first pairing data includes a software token to validate the accessory device to a server device. The mobile device will transmit the first pairing data to the server device for validation. The accessory device can subsequently receive a request to finalize the pairing process from the mobile device, where the request to finalize the pairing process includes second pairing data generated by the server device (706). The mobile device can then validate the second pairing data, where validating the second pairing data includes validating a signature of the pairing data, the signature generated by the server device (708). The accessory can then transmit a pairing status to the mobile device to indicate a success or failure of the pairing process, where the pairing status is determined in part on validity of the pairing data (710).

The pairing process of method 700 is a server-mediated pairing process to lock the accessory device to an account associated with the mobile device and the software token is a first software token that is a one-time token. The second pairing data includes a second software token that will be stored to the non-volatile memory of the accessory. Persistence of the second software token can be confirmed by reading the second software token after it is stored and comparing the read software token with the received software token.

During the server mediated pairing process described above, the accessory 220 and mobile device 230 perform a collaborative key generation process. The process of collaborative generation of cryptographic keying material by the accessory and the electronic device is intertwined with the pairing operations performed with the pairing lock server 240. The pairing processes is voluntarily entangled with the collaborative key generation process so that if the registration server denies the pairing, the accessory and the electronic device will both independently fail the pairing operation.

Figure 8:
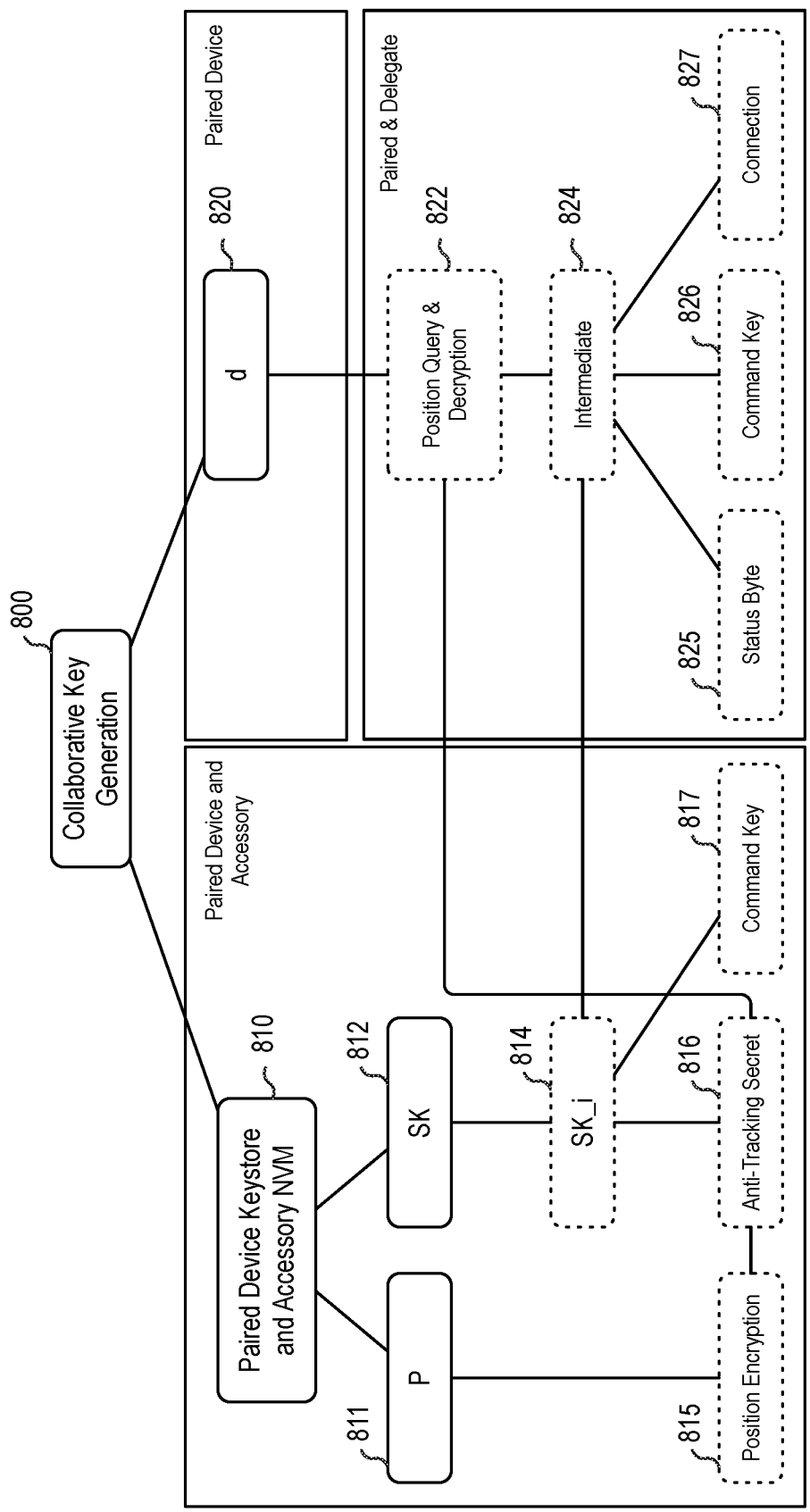
FIG. 8 illustrates a key hierarchy enabled via a collaborative key generation process described herein.

FIG. 8 illustrates a key hierarchy 800 enabled via the collaborative key generation process described herein. In one embodiment the key hierarchy includes three sets of keys. A first set of keys is stored on the accessory device (accessory 220) and an electronic device associated with the account to which the accessory is paired (e.g., mobile device 230). A second set of keys is stored on the paired device. A third set of keys is stored on the paired device and any potential delegate devices. Each set of keys may be stored securely on the respective devices, with the keys being encrypted during storage. In one embodiment the first set of keys are held in a storage object 810 that is stored to the paired device keystore and the non-volatile memory of the accessory device. The first set of keys include a public key 811, a secret key 812, and derivatives of those keys. A second set of keys includes a device key 820 that is stored only on the paired device. The third set of keys includes position query and decryption keys 822, intermediate keys 824, status byte keys 825, command keys 826, and connection keys 827, which may be delegated to a delegate device.

The public key 811 is used to derive further keys that are broadcast with a wireless beacon and encrypt location data for the accessory. The public key 811 cannot be used directly, as direct use of the public key may allow observers to track the accessory. Instead, the public key 811 is stored in secure storage and the keys that are broadcast are keys that are derived based on the public key 811. In one embodiment, diversified position encryption keys 815 are derived based on a set of anti-tracking secrets 816. The anti-tracking secrets 816 are derived from a set of diversified secret keys 814. The diversified secret keys 814 are derived from the secret key 812. In one embodiment, the set of diversified secret keys 814 includes at least one key for each privacy window. The diversified secret keys 814 can be used to derive a set of anti-tracking secrets 816 and paired command keys 817. The anti-tracking secrets 816 are used to derive the diversified position encryption keys 815 that are broadcast by the accessory device and used to encrypt the location of the accessory device that is uploaded to a location server by a finder device. The set of diversified position encryption keys 815, anti-tracking secrets 816, includes at least one key per privacy window.

In one embodiment, device key 820 can be used to derive a set of position query and decryption keys 822, which are cryptographically related to the set of diversified position encryption keys 815, and anti-tracking secrets 816. The set of diversified secret keys 814 can also be used to derive the set of intermediate keys 824. The set of intermediate keys 824 can be used to derive the set of status byte keys 825, command keys 826, and connection keys 827. As with the diversified position encryption keys 815, diversified secret keys 814, anti-tracking secrets 816, and paired device command keys in the first set of keys, each set of keys in the third set of keys (e.g., paired device and delegate keys) are derived for specific privacy windows and are only valid during the specific privacy window for which those keys are derived. Collaborative key generation can be used to generate the public key 811, secret key 812, and device key 820, with the privacy window keys derived based on the collaboratively generated keys.

The address that is broadcast by the accessory is determined based on the set of keys in use on the accessory. A key rotation is performed by the accessory and the mobile device, or other electronic device that will connect to the accessory. The keys can be rotated after the expiration of a privacy interval to prevent the long-term tracking of an accessory based on the address broadcast by the accessory. The length of the privacy interval can vary. However key rotation consistency should be maintained between the accessory and the connecting electronic device. The accessory 220 can derive $SK_i$ for period i=[counter/N] where counter is the current value of an internal counter and N is the number of seconds for each privacy window. For example, for a 15-minute privacy window, N=900. The paired device can derive $SK_i$ by setting either $$i = \left\lfloor \frac{UT_{lookup} - UT_{NVM}}{N} \right\rfloor;$$

$$i = \left\lfloor \frac{UT_{now} - UT_{NVM}}{N} \right\rfloor;$$

$$\text{or } i = \left\lfloor \frac{UT_{delegate} - UT_{NVM}}{N} \right\rfloor,$$

where UT lookup is the time corresponding to the period that position reports should be retrieved for, $UT_{now}$ is the current time, and $UT_{delegate}$ is the delegation period that a delegate is allowed to control the secondary device. $UT_{NVM}$ refers to the time when the accessory 220 was provisioned by the primary device, which can be retrieved from the non-volatile memory of the secondary device. In one embodiment the primary device can set $SK_0 = SK_{NVM}$ and compute $SK_{j+1} = KDF (SK_j, \text{"update"})$ for $j = 0, \ldots, i-1$, where $|SK_x| = 32$ bytes for any x, although the size of each key can vary across embodiments.

Using diversified secret key $SK_i$, command key $CK_i$ and anti-tracking secret $AT_i$ can be generated. In one embodiment, $CK_i = KDF (SK_i, \text{"command"})$. Additionally, $AT_i = (u_1, =KDF (SK_i, \text{"diversify"}))$, where $(u_i, v_i)$ represent coordinates of an elliptic curve point. In one embodiment, $AT_i$ is a 72-byte secret, although the size can vary across embodiments.

Diversified public key $P_i$ is a diversified version of public key P. $P_i$ can be derived without knowledge of private device key d and can be used instead of P as the position encryption key to prevent long term tracking of the secondary device. Where $AT_i = P_i = u_i \cdot P + v_i \cdot G$. In one embodiment, $u_i$ and $v_i$ are turned into valid scalars per FIPS 186-4, B.5.1 Per-Message Secret Number Generation Using Extra Random Bits. For example, $u_i := (u_1 \bmod (n-1)) + 1$ and $v_i := (v_i \bmod (n-1)) + 1$ with n being the order of base point G, as defined for P-224.

Diversified key $d_i$ is the diversified private key d and can be passed to delegates without revealing d. Having $AT_i$ and $SK_i$, the primary device can compute $d_i = (d \cdot u_i + v_i)$. A set of $d_i$ keys can be provided to a delegate device. The delegate device can then compute $P_i = d_i \cdot G$. The primary device and the delegate can use $P_i$ to query the location of the accessory 220 at a location server.

Intermediate key $IK_i = KDF (SK_i, \text{"intermediate"})$ can be computed by the primary device and shared with a delegate without revealing private key d. The delegate (and the primary device) can compute status byte key $BK_i$, command key $CK_i$, and connection key $LTK_i$. $BK_i$ is the encryption key used to protect secrets transmitted via the status byte, which is broadcast by the accessory 220 while beaconing, where $(BK_i, BIV_i) = KDF (IK_i, \text{"status"})$. $CK_i$ is the command key used to ensure authenticity of commands send to the accessory 220, where $CK_i = KDF (IK_i, \text{"command"})$. $LTK_i$ is the connection key that is used to establish a connection to the secondary device, where $LTK_i = KDF (IK_i, \text{"connect"})$. In one embodiment, each key is a 32-byte key and $BIV_i$ is a 16-byte value, although the sizes may vary across embodiments.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 9:
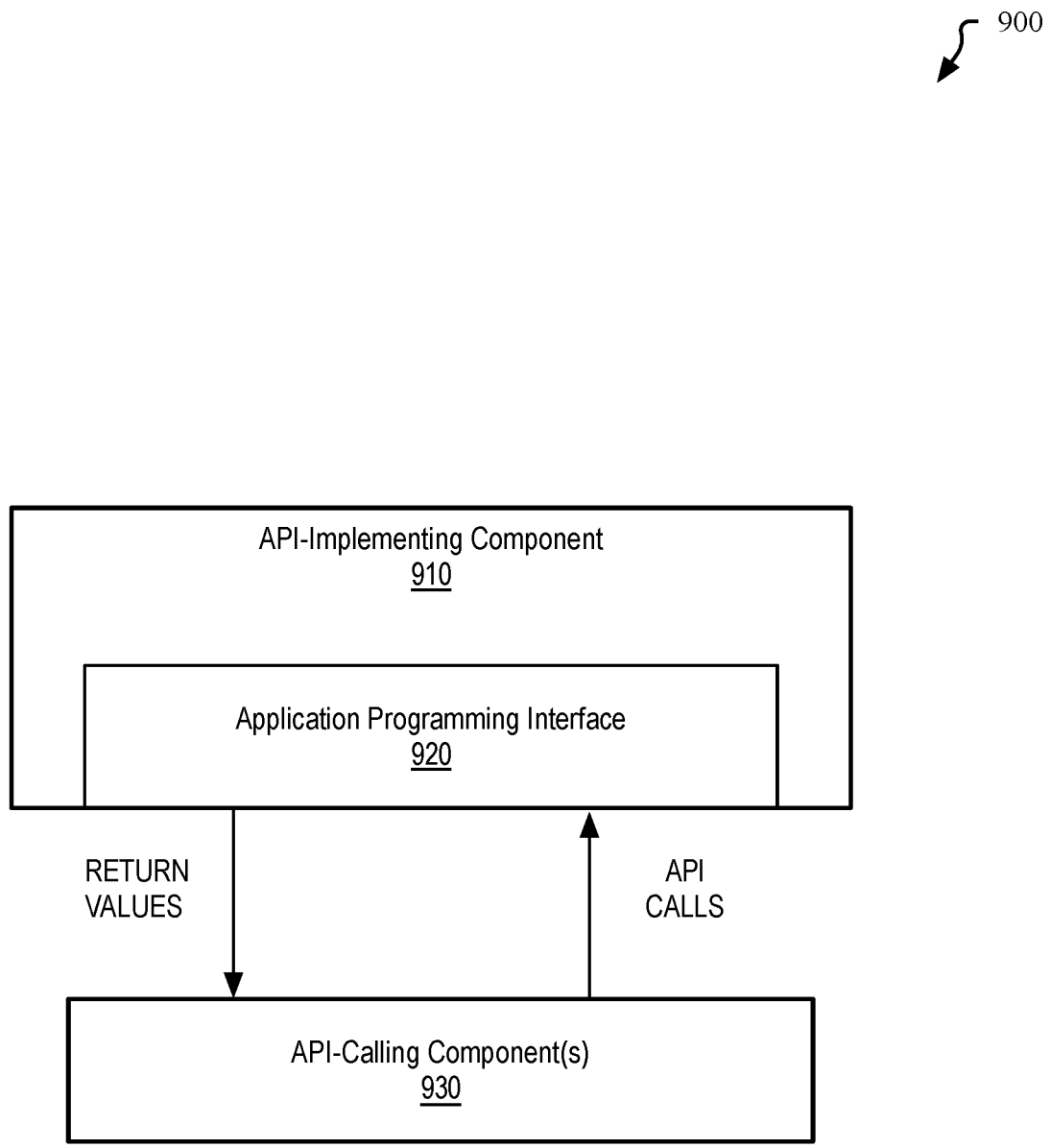
FIG. 9 is a block diagram illustrating an exemplary API architecture, which may be used in some embodiments of the invention.

FIG. 9 is a block diagram illustrating an exemplary API architecture, which may be used in some embodiments of the invention. As shown in FIG. 9, the API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable storage medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 10A:
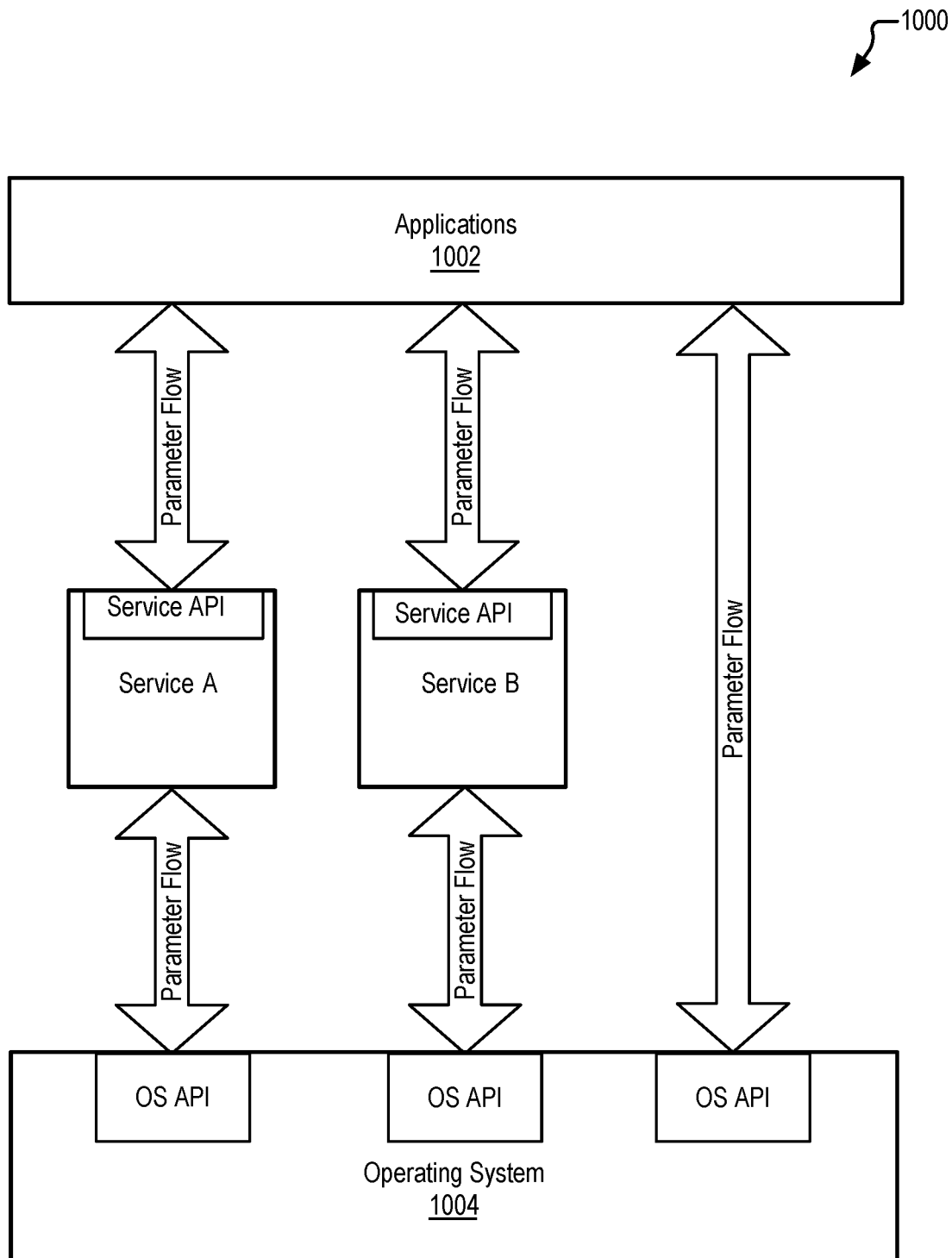
FIG. 10A-10B are block diagrams of exemplary API software stacks, according to embodiment.
Figure 10B:
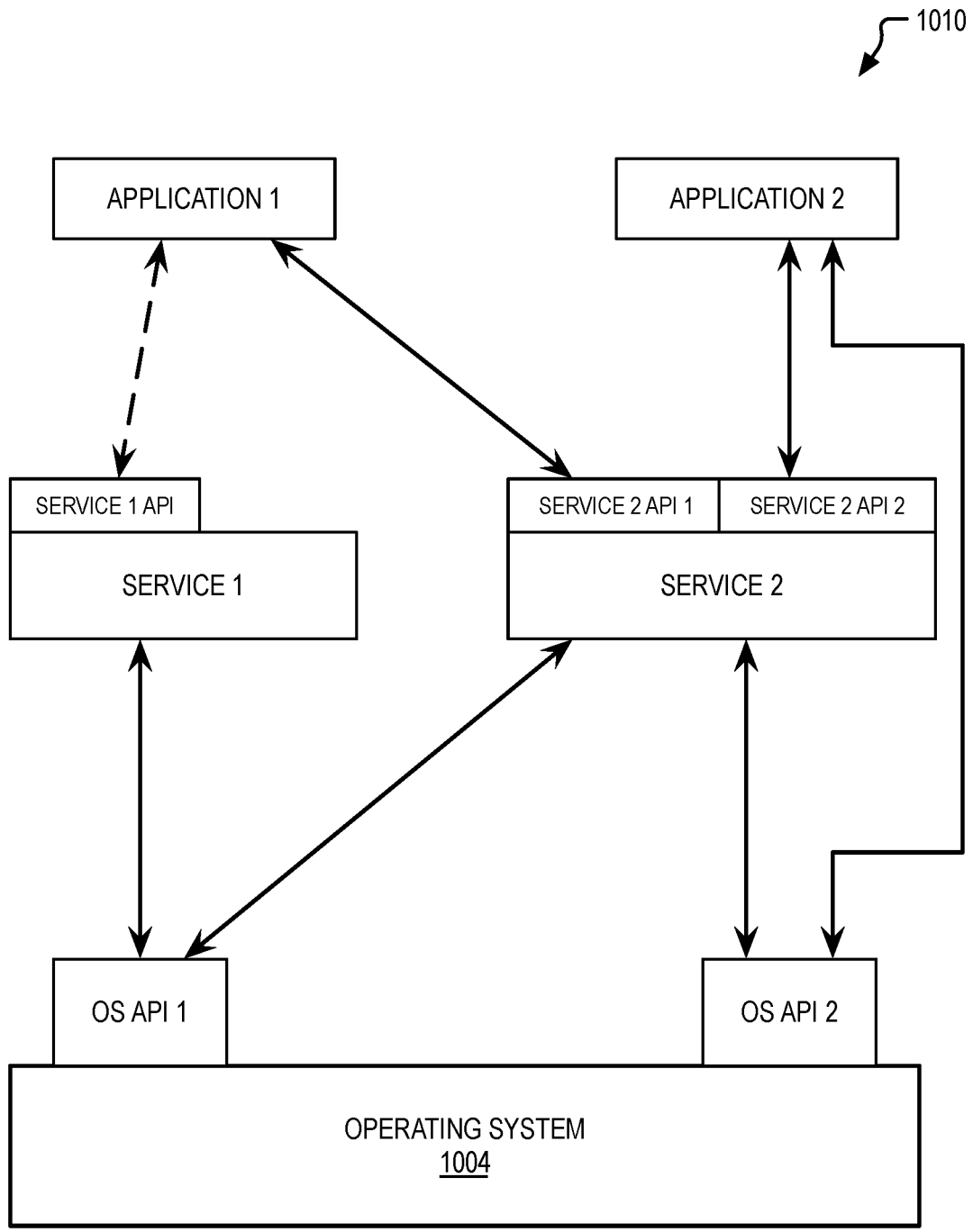

FIG. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary API software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 11:
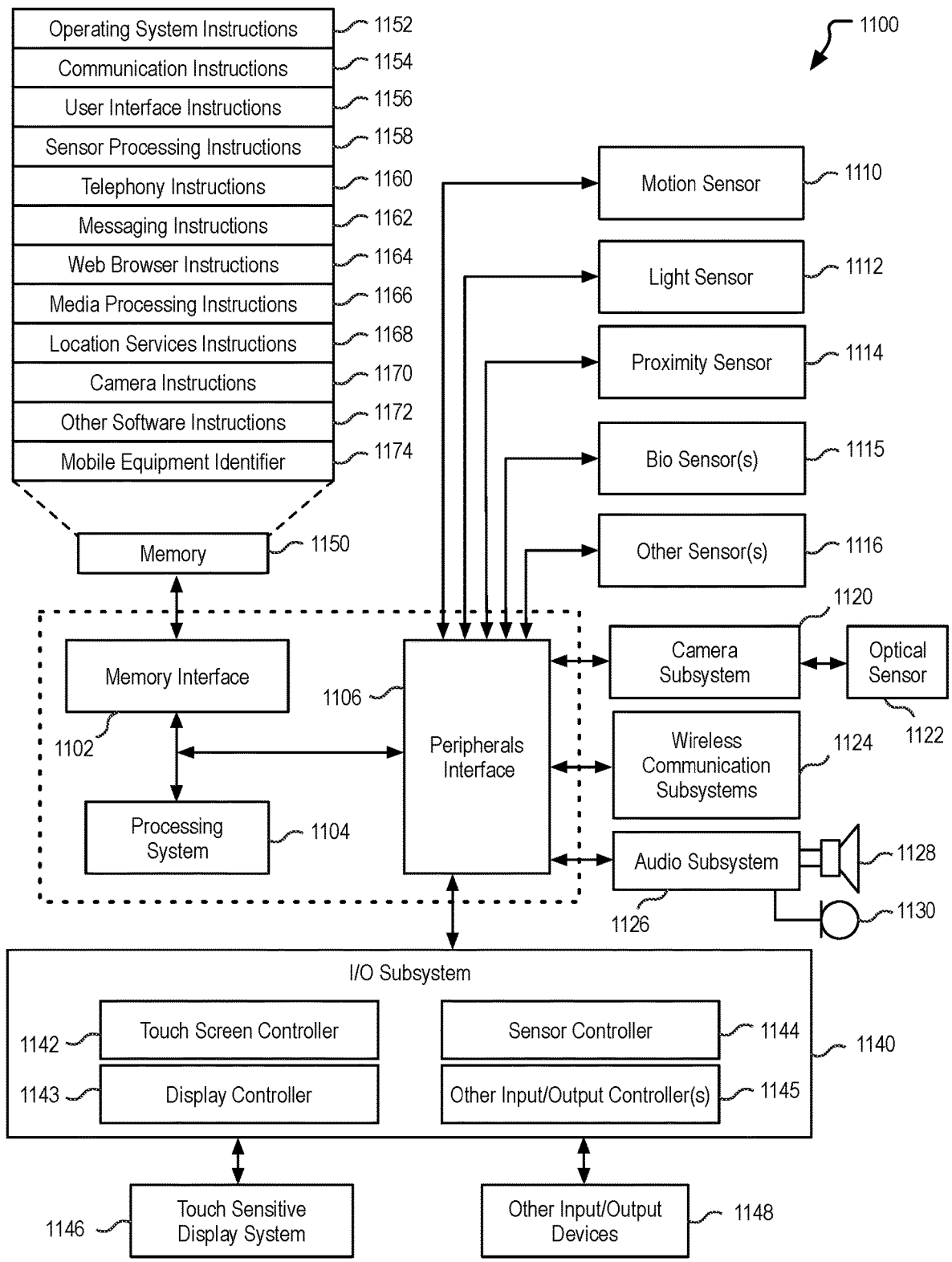
FIG. 11 is a block diagram of a device architecture for a mobile or embedded device, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment, the display controller 1143 can provide frame data to the touch sensitive display system 1146 at a variable frame rate.

In one embodiment, a sensor processor 1144 is included to monitor, control, and/or processes data received from one or more of the motion sensor 1110, light sensor 1112, proximity sensor 1114, or other sensors 1116. The sensor processor 1144 can include logic to interpret sensor data to determine the occurrence of one of more motion events or activities by analysis of the sensor data from the sensors. In one embodiment the sensor processor 1144 also manages the camera subsystem 1120 and audio subsystem 1126, with couple with the sensor processor 1144 via the peripherals interface 1106. Multimedia captured by the camera subsystem 1120 and/or audio subsystem 1126 may be relayed to the memory 1150 to be accessed by software executing on the processing system 1104, or processed by the sensor processor 1144 or other processors in the system to determine environmental metadata. In one embodiment, the sensor processor may configure a live audio stream to a hearing-aid device or wireless earbuds that are connected via a wireless processor, enabling the audio stream to bypass the processing system 1104 and memory 1150.

In one embodiment, the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
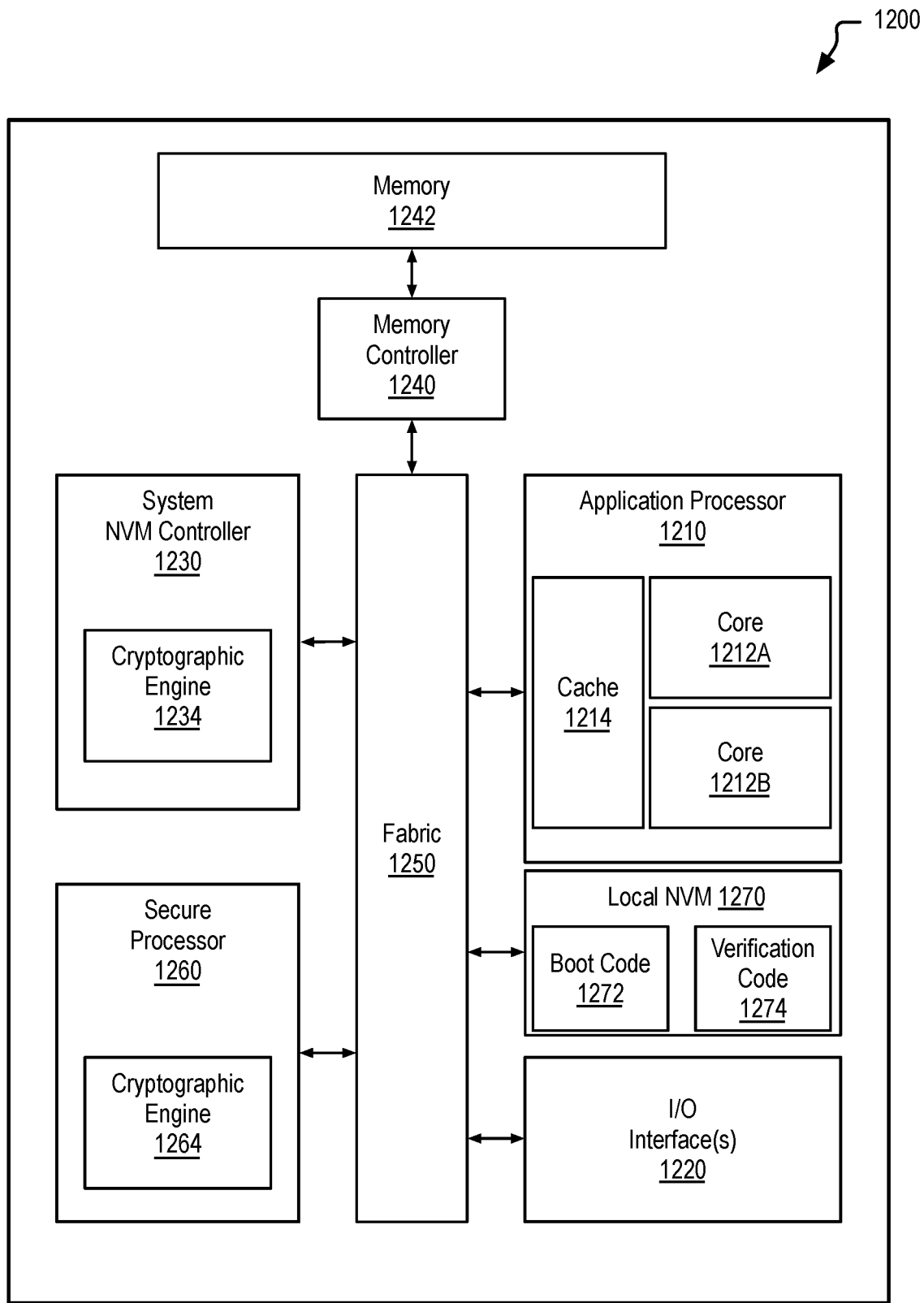
FIG. 12 illustrates an exemplary processing system suitable for the generation of cryptographic material.

FIG. 12 illustrates an exemplary processing system suitable for the generation of cryptographic material. In one embodiment the processing system 1200 includes an application processor 1210 and an interconnect fabric 1250 that enables communication within the processing system 1200, although a system bus may also be used in other embodiments. In one embodiment the application processor 1210 includes multiple cores 1212A-1212B and at least one cache 1214. The application processor 1210 can facilitate execution of various applications on an electronic device, such as a smartphone, table, wearable device, or other electronic devices described herein. The application processor 1210 can then securely boot using boot code 1272 stored on local non-volatile memory 1270, which can be a separate storage device than the primary non-volatile memory of the system, or can be a secure portion of the primary non-volatile memory. The boot code can be accompanied by verification code 1274 that can be used verify that the boot code 1272 has not been modified.

The processing system 1200 also includes a secure processor 1260, which can be any secure processor described herein, such as but not limited to a secure enclave processor (SEP), a secure element, or a trusted platform module (TPM). The secure processor 1260 includes a secure circuit configured to maintain user keys for encrypting and decrypting data keys associated with a user. As used herein, the term "secure circuit" refers to a circuit that protects an isolated, internal resource from being directly accessed by any external circuits. The secure processor 1260 can be used to secure communication with the peripherals connected via the peripheral hardware interface(s) 1220. The secure processor 1260 can include a cryptographic engine 1264 that includes circuitry to perform cryptographic operations for the secure processor 1260. The cryptographic operations can include the encryption and decryption of data keys that are used to perform storage volume encryption or other data encryption operations within a system.

The processing system 1200 can also include a system non-volatile memory controller 1230 that manages primary non-volatile memory of the system. The system non-volatile memory controller can also include a cryptographic engine 1234 to enable the real-time encryption and decryption of data stored to the system non-volatile memory. The cryptographic engines 1234, 1264 may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

Each of the application processor 1210, secure processor 1260 and system non-volatile memory controller 1230 described herein may make use of a shared memory 1242 that is accessible via a memory controller 1240 coupled with the interconnect fabric 1250.

Figure 13:
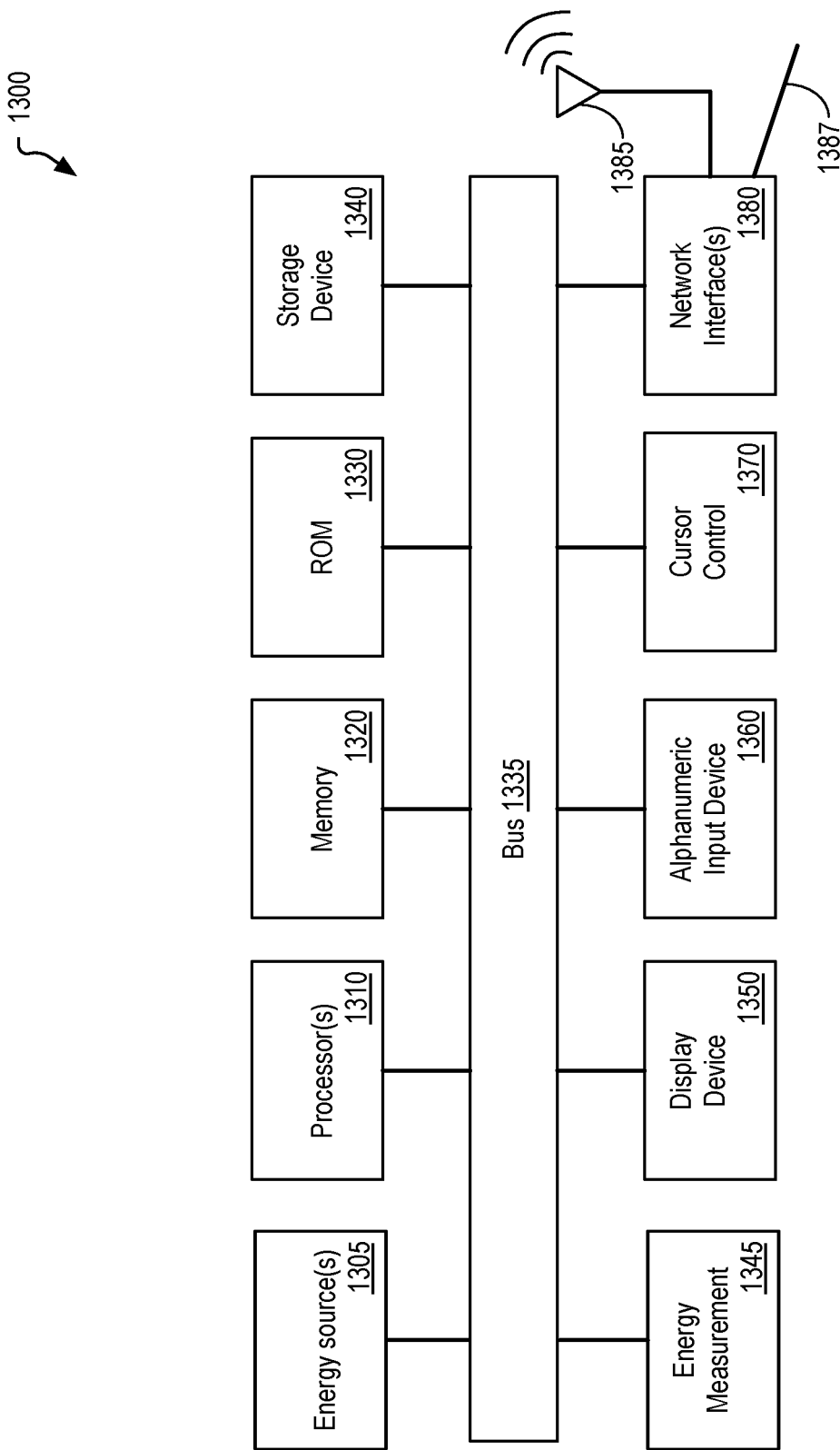
FIG. 13 is a block diagram of a computing system, according to an embodiment.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes bus 1335 or other communication device to communicate information, and processor(s) 1310 coupled to bus 1335 that may process information. While the computing system 1300 is illustrated with a single processor, the computing system 1300 may include multiple processors and/or co-processors. The computing system 1300 further may include memory 1320, which can be random access memory (RAM) or other dynamic storage device coupled to the bus 1335. The memory 1320 may store information and instructions that may be executed by processor(s) 1310. The memory 1320 may also be used to store temporary variables or other intermediate information during execution of instructions by the processor(s) 1310.

The computing system 1300 may also include read only memory (ROM) 1330 and/or another data storage device 1340 coupled to the bus 1335 that may store information and instructions for the processor(s) 1310. The data storage device 1340 can be or include a variety of storage devices, such as a flash memory device, a magnetic disk, or an optical disc and may be coupled to computing system 1300 via the bus 1335 or via a remote peripheral interface.

The computing system 1300 may also be coupled, via the bus 1335, to a display device 1350 to display information to a user. The computing system 1300 can also include an alphanumeric input device 1360, including alphanumeric and other keys, which may be coupled to bus 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 wireless standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more energy sources 1305 and one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method for a server mediated pairing process, the method comprising:
    receiving a request via an interface of a first electronic device to initiate a server-mediated pairing process with a second electronic device;
    detecting an advertisement broadcast by the second electronic device;
    generating a server-mediated pairing request, wherein the server-mediated pairing request includes pairing data having a first portion associated with the first electronic device and a second portion associated with the detected advertisement, wherein the first portion is generated by the first electronic device and includes an authentication token for an account associated with the first electronic device and the server-mediated pairing process is to create a pairing lock between the account associated with the first electronic device and the second electronic device, the pairing lock to limit the second electronic device to being paired with devices associated with the account;
    sending the server-mediated pairing request to a server device for validation;
    receiving a server-mediated pairing response from the server device;
    transmitting the server-mediated pairing response to the second electronic device; and
    receiving a response status from the second electronic device.

2. The method of claim 1, further comprising:
    finalizing or aborting the server-mediated pairing process based on the server-mediated pairing response.

3. The method of claim 1, wherein the second portion is received from the second electronic device in response to a request to initiate the server-mediated pairing process and includes a first software token that is associated with the second electronic device.

4. The method of claim 3, wherein the first software token is cryptographically associated with the second electronic device and is a one-time token to authenticate the second electronic device to the server device.

5. The method of claim 3, wherein the first software token is cryptographically associated with the second electronic device via a hardware identifier or hardware key of the second electronic device.

6. The method of claim 3, further comprising:
    finalizing the server-mediated pairing process based on a success response, wherein finalizing the server-mediated pairing process includes:
        transmitting an encrypted blob received from the server device to the second electronic device, the second electronic device to validate the encrypted blob to verify the validity of the server device, wherein the encrypted blob includes a second software token that was generated for the second electronic device, the encrypted blob is opaque to the first electronic device, and the second software token is to replace the first software token on the second electronic device.

7. A non-transitory machine readable medium having instructions stored thereon, the instructions to cause one or more processors of an accessory device to perform operations comprising:
    receiving a request via an interface of a first electronic device to initiate a server-mediated pairing process with a second electronic device;
    detecting an advertisement broadcast by the second electronic device;
    generating a server-mediated pairing request, wherein the server-mediated pairing request includes pairing data having a first portion associated with the first electronic device and a second portion associated with the detected advertisement, wherein the first portion is generated by the first electronic device and includes an authentication for an account associated with the first electronic device and the server-mediated pairing process is to create a pairing lock between the account associated with the first electronic device and the second electronic device, the pairing lock to limit the second electronic device to being paired with devices associated with the account;
    sending the server-mediated pairing request to a server device for validation;
    receiving a server-mediated pairing response from the server device;
    transmitting the server-mediated pairing response to the second electronic device; and
    receiving a response status from the second electronic device.

8. The non-transitory machine readable medium of claim 7, the operations further comprising:
    finalizing or aborting the server-mediated pairing process based on the server-mediated pairing response.

9. The non-transitory machine readable medium of claim 7, wherein the second portion is received from the second electronic device in response to a request to initiate the server-mediated pairing process and includes a first software token that is associated with the second electronic device.

10. The non-transitory machine readable medium of claim 9, wherein the first software token is cryptographically associated with the second electronic device and is a one-time token to authenticate the second electronic device to the server device.

11. The non-transitory machine readable medium of claim 9, wherein the first software token is cryptographically associated with the second electronic device via a hardware identifier or hardware key of the second electronic device.

12. The non-transitory machine readable medium of claim 9, the operations further comprising:
finalizing the server-mediated pairing process based on a success response, wherein finalizing the server-mediated pairing process includes:
transmitting an encrypted blob received from the server device to the second electronic device, the second electronic device to validate the encrypted blob to verify the validity of the server device, wherein the encrypted blob includes a second software token that was generated for the second electronic device, the encrypted blob is opaque to the first electronic device, and the second software token is to replace the first software token on the second electronic device.

13. A device comprising:
a network interface coupled with a bus;
a memory coupled to the bus, the memory to store instructions for execution; and
one or more processors coupled with the bus, the one or more processors to execute the instructions stored in the memory, wherein the instructions to cause the one or more processors to perform a server-mediated pairing process, the one or more processors to:
receive a request via an interface of a first electronic device to initiate a server-mediated pairing process with a second electronic device;
detect an advertisement broadcast by the second electronic device;
generating a server-mediated pairing request, wherein the server-mediated pairing request includes pairing data having a first portion associated with the first electronic device and a second portion associated with the detected advertisement, wherein the first portion is generated by the first electronic device and includes an authentication token for an account associated with the first electronic device and the server-mediated pairing process is to create a pairing lock between the account associated with the first electronic device and the second electronic device, the pairing lock to limit the second electronic device to being paired with devices associated with the account;
send the server-mediated pairing request to a server device for validation;
receive a server-mediated pairing response from the server device;
transmit the server-mediated pairing response to the second electronic device; and
receive a response status from the second electronic device.

14. The device of claim 13, the instructions further causing the one or more processors to:
finalize or abort the server-mediated pairing process based on the server-mediated pairing response.

15. The device of claim 13, wherein the second portion is received from the second electronic device in response to a request to initiate the server-mediated pairing process and includes a first software token that is associated with the second electronic device.

16. The device of claim 15, wherein the first software token is cryptographically associated with the second electronic device and is a one-time token to authenticate the second electronic device to the server device.

17. The device of claim 15, wherein the first software token is cryptographically associated with the second electronic device via a hardware identifier or hardware key of the second electronic device.

18. The device of claim 15, the instructions further causing the one or more processors to:
finalize the server-mediated pairing process based on a success response, wherein finalizing the server-mediated pairing process includes:
transmit an encrypted blob received from the server device to the second electronic device, the second electronic device to validate the encrypted blob to verify the validity of the server device, wherein the encrypted blob includes a second software token that was generated for the second electronic device, the encrypted blob is opaque to the first electronic device, and the second software token is to replace the first software token on the second electronic device.

* * * * *